United States Patent
Kawaguchi

(10) Patent No.: US 12,412,580 B2
(45) Date of Patent: Sep. 9, 2025

(54) SOUND EXTRACTION SYSTEM AND SOUND EXTRACTION METHOD

(71) Applicant: Hitachi, Ltd., Tokyo (JP)

(72) Inventor: Yohei Kawaguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 17/986,417

(22) Filed: Nov. 14, 2022

(65) Prior Publication Data
US 2023/0169977 A1 Jun. 1, 2023

(30) Foreign Application Priority Data
Nov. 29, 2021 (JP) .................... 2021-192632

(51) Int. Cl.
G10L 15/26 (2006.01)
G10L 15/02 (2006.01)
G10L 21/0272 (2013.01)

(52) U.S. Cl.
CPC .............. G10L 15/26 (2013.01); G10L 15/02 (2013.01); G10L 21/0272 (2013.01)

(58) Field of Classification Search
None
See application file for complete search history.

(56) References Cited

U.S. PATENT DOCUMENTS

| | | | |
|---|---|---|---|
| 11,961,522 B2* | 4/2024 | Kim ................. | G10L 25/21 |
| 2014/0278372 A1 | 9/2014 | Nakadai et al. | |
| 2016/0322055 A1* | 11/2016 | Sainath ............. | H04R 3/005 |
| 2017/0075649 A1* | 3/2017 | Duong .............. | G06F 3/165 |
| 2018/0261225 A1* | 9/2018 | Watanabe .......... | G10L 15/28 |
| 2019/0138095 A1* | 5/2019 | Visser .............. | G10L 15/24 |
| 2022/0238119 A1* | 7/2022 | Koshinaka ......... | G10L 17/18 |

(Continued)

FOREIGN PATENT DOCUMENTS

| | | |
|---|---|---|
| JP | 2014-178886 A | 9/2014 |
| JP | 2017-228164 A | 12/2017 |
| JP | 2018-156627 A | 10/2018 |

(Continued)

OTHER PUBLICATIONS

Tran, An, Konstantinos Drossos, and Tuomas Virtanen. "Wavetransformer: An architecture for audio captioning based on learning temporal and time-frequency information." 2021 29th European Signal Processing Conference (EUSIPCO). IEEE, 2021. (Year: 2021).*

(Continued)

*Primary Examiner* — Andrew C Flanders
*Assistant Examiner* — Theodore Withey
(74) *Attorney, Agent, or Firm* — Crowell & Moring LLP

(57) ABSTRACT

To provide a sound extraction system and a sound extraction method capable of accurately extracting, from mixture signals, a signal corresponding to a sound which a user wants to extract. The sound extraction system includes a sound extraction device configured to extract, from mixture signals including a signal corresponding to an extraction target sound, the signal corresponding to the extraction target sound. The sound extraction device is configured to extract the signal corresponding to the extraction target sound from the mixture signals based on the mixture signals and a text representing a range of the extraction target sound.

14 Claims, 26 Drawing Sheets

(56) References Cited

U.S. PATENT DOCUMENTS

2022/0392434 A1* 12/2022 Asi ...................... G10L 15/063

FOREIGN PATENT DOCUMENTS

| JP | 2020-134567 A | | 8/2020 |
|---|---|---|---|
| KR | 20210019151 A | * | 2/2021 |
| KR | 20210059581 A | * | 5/2021 |

OTHER PUBLICATIONS

Elizalde, Benjamin, Shuayb Zarar, and Bhiksha Raj. "Cross modal audio search and retrieval with joint embeddings based on text and audio." ICASSP 2019-2019 IEEE International Conference on Acoustics, Speech and Signal Processing (ICASSP). IEEE, 2019. (Year: 2019).*

Sudo Y. et al., "Environmental sound segmentation utilizing Mask U-Net," 2019 IEEE/RSJ International Conference on Intelligent Robots and Systems (IROS), Macau, China, Nov. 4-8, 2019, pp. 5340-5345, (six (6) pages).

Japanese-language Office Action issued in Japanese Application No. 2021-192632 dated Mar. 18, 2025 with English translation (6 pages).

Yamamura et al., "Sound-Source Selected System by Onomatopoeia to Simultaneous Two or more Sound Sources", Proceedings of the 74th National Conference on Artificial Intelligence and Cognitive Science, Mar. 6, 2012, vol. 2 (2 pages).

* cited by examiner

SOUND EXTRACTION SYSTEM AND SOUND EXTRACTION METHOD

BACKGROUND OF THE INVENTION

1. Field of the Invention

The present invention relates to a sound extraction system and a sound extraction method.

2. Description of the Related Art

It is important to extract a sound having a specific feature from sounds in which a plurality of sound sources are mixed. For example, sounds are recorded, and an abnormality of a facility or a machine or a sign thereof is automatically detected from a sound (abnormal sound). However, environmental noise may be loud, and accuracy of abnormal sound detection in such a case may be significantly reduced. Therefore, in order to improve the accuracy of the abnormal sound detection and analyze the abnormal sound itself, it is required to extract (also referred to as emphasize) a target sound of the facility or the machine from the recorded sounds.

A surrounding situation also is recognized based on sounds recorded by a microphone of a monitoring camera, a drive recorder, a watching robot, a smart speaker, and the like. However, environmental noise may still be loud, and accuracy of situation recognition in such a case may be significantly reduced. Therefore, in order to improve the accuracy of the situation recognition and analyze the recorded sounds, it is required to extract a sound serving as a clue for the situation recognition from the recorded sounds.

Regarding extraction of a sound, for example, techniques disclosed in JP-A-2014-178886 (Patent Literature 1) and Y. Sudo, "Environmental sound segmentation utilizing Mask U-Net," in IEEE/RSJ International Conference on Intelligent Robots and Systems (IROS), 2019 (Non-Patent Literature 1) are known. Non-Patent Literature 1 discloses that "The waveforms of mixed environmental sounds are transformed into spectrogram. By using this input, Mask U-Net consists of sound event detection CNN and segmentation U-Net predicts masks for separating out each class from the input spectrogram. Inverse SIFT is applied to reconstruct the time domain signal.". In the technique disclosed in Non-Patent Literature 1 (hereinafter, also referred to as "usual technique"), sounds are classified into a finite number of types of events defined in advance, and a sound is extracted for each type of event.

However, in the related art, when a range of a sound which a user wants to extract does not match a type of event defined in advance, a sound which the user wants to extract cannot be extracted. As an example, in the related art, it is not possible to extract a sound with a granularity finer than that of a type of event defined in advance. For example, even if a type of event is defined as a sound of hitting a metal, the sound of hitting a metal may include a sound of "bang" and a sound of "clang-clang". Therefore, for example, when the user wants to extract the sound of "bang" as the "sound of hitting a metal", in the related art, the sound of "clang-clang" may be extracted as the sound of hitting a metal by classification of an event of the "sound of hitting a metal".

Thus, in the related art, a sound which the user wants to extract may not be accurately extracted. The invention is made to solve the above problems. That is, one object of the invention is to provide a sound extraction system and a sound extraction method capable of accurately extracting a signal corresponding to a sound which a user wants to extract from mixture signals.

SUMMARY OF THE INVENTION

In order to solve the above problems, a sound extraction system according to the invention includes a sound extraction device configured to extract, from mixture signals including a signal corresponding to an extraction target sound, the signal corresponding to the extraction target sound, and the sound extraction device is configured to extract the signal corresponding to the extraction target sound from the mixture signals based on the mixture signals and a text representing a range of the extraction target sound.

A sound extraction method according to the invention is performed using a sound extraction device configured to extract, from mixture signals including a signal corresponding to an extraction target sound, the signal corresponding to the extraction target sound, and the sound extraction method includes: extracting, by the sound extraction device, the signal corresponding to the extraction target sound from the mixture signals based on the mixture signals and a text representing a range of the extraction target sound.

According to the invention, a signal corresponding to a sound which a user wants to extract can be accurately extracted from mixture signals.

DESCRIPTION OF THE PREFERRED EMBODIMENTS

Hereinafter, a sound extraction system according to embodiments of the invention will be described with reference to the drawings and the like.

First Embodiment

SUMMARY OF INVENTION

Figure 1:
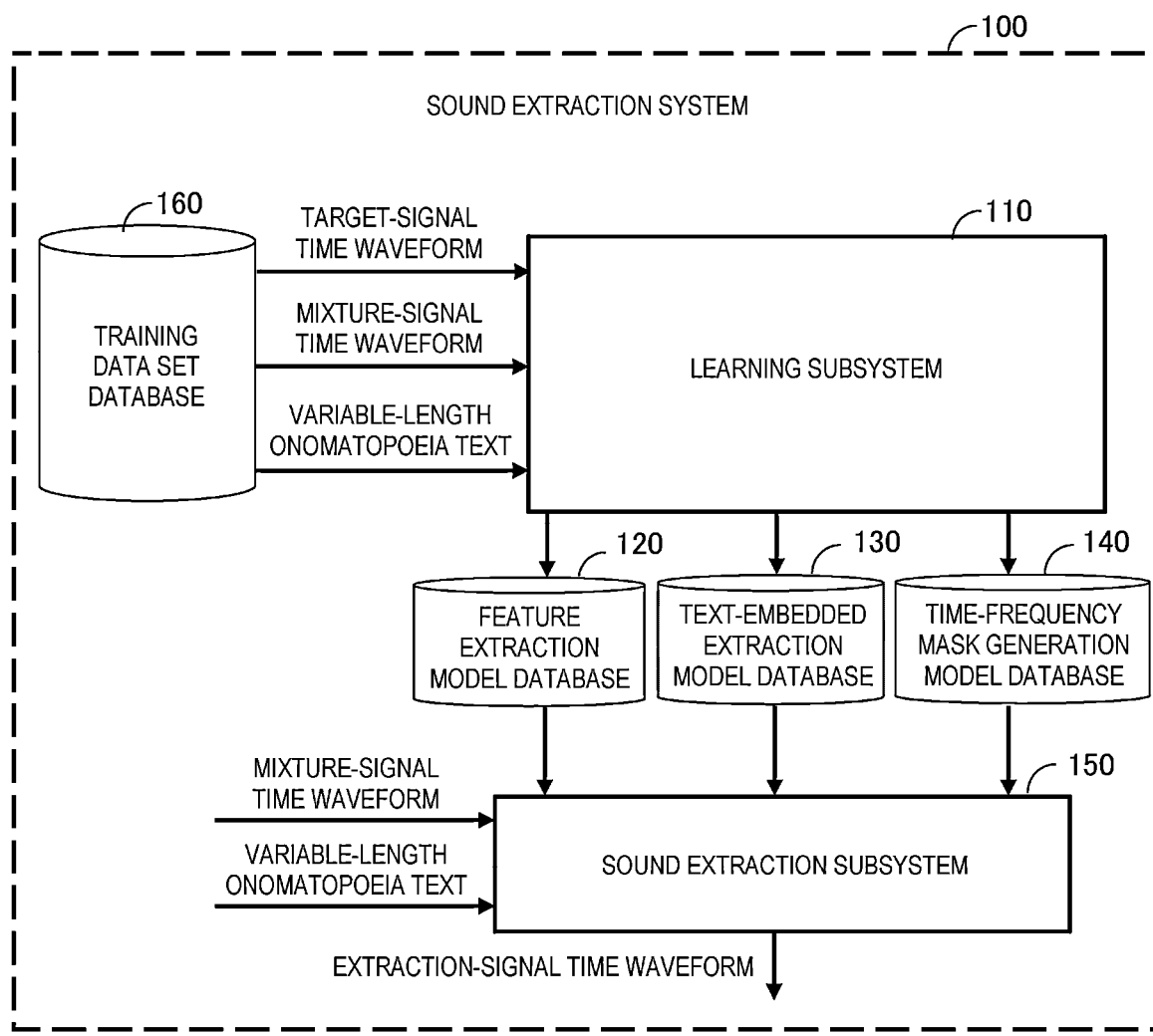
FIG. 1 is a block configuration diagram showing a schematic configuration example of a sound extraction system according to a first embodiment of the invention.

FIG. 1 is a block configuration diagram showing a schematic configuration example of a sound extraction system 100 according to a first embodiment of the invention. As shown in FIG. 1, the sound extraction system 100 includes a learning subsystem 110, a feature extraction model database 120, a text-embedded extraction model database 130, a time-frequency mask generation model database 140, a sound extraction subsystem 150, and a training data set database 160. The learning subsystem 110 may also be referred to as a "learning device". The sound extraction subsystem 150 may also be referred to as a "sound extraction device".

First, the sound extraction system 100 reads out, from the training data set database 160, a set (also referred to as a "training data set") of three items including a target-signal (a signal corresponding to an extraction target sound) time waveform, a "mixture-signal time waveform obtained by mixing the target-signal time waveform (target signal) and noise other than the extraction target sound (a time waveform of a signal corresponding to noise (a signal corresponding to noise))", and a variable-length onomatopoeia text (an onomatopoeia text corresponding to the extraction target sound), and inputs the set to the learning subsystem 110.

Here, instead of reading out the "mixture-signal time waveform obtained by mixing the target-signal time waveform (target signal) and noise other than the extraction target sound (a time waveform of a signal corresponding to noise (a signal corresponding to noise))" from the training data set database 160, by reading out the "noise other than the extraction target sound (a time waveform of a signal corresponding to noise (a signal corresponding to noise))" before mixing and mixing the noise other than the extraction target sound with the target-signal time waveform (the signal corresponding to the extraction target sound), the "mixture-signal time waveform obtained by mixing the target-signal time waveform (target signal) and noise other than the extraction target sound (a time waveform of a signal corresponding to noise (a signal corresponding to noise))" may be generated, and the set of three items may be generated. Mixing the signals after the noise is read out has two advantages. One advantage is that by mixing signals at a signal-to-noise ratio assumed when the sound extraction system 100 is used to create a training data set, a model can be trained such that extraction suitable for a signal-to-noise ratio for each use scene can be performed. The other advantage is that a storage capacity required for the training data set database 160 can be reduced.

A set of three items generated by mixing after reading from the training data set database 160 is also the set of three items and is hereinafter referred to as the set of three items or the training data set.

The learning subsystem 110 executes learning processing based on the set of three items, outputs a feature extraction model, a text-embedded extraction model, and a time-frequency mask generation model, and stores the feature extraction model, the text-embedded extraction model, and the time-frequency mask generation model in the respective databases. That is, the learning subsystem 110 stores the feature extraction model in the feature extraction model database 120, stores the text-embedded extraction model in the text-embedded extraction model database 130, and stores the time-frequency mask generation model in the time-frequency mask generation model database 140.

The sound extraction subsystem 150 reads out the feature extraction model, the text-embedded extraction model, and the time-frequency mask generation model from the databases (the feature extraction model database 120, the text-embedded extraction model database 130, and the time-frequency mask generation model database 140), and executes sound extraction processing based on (using) the read feature extraction model, text-embedded extraction model, and time-frequency mask generation model. Accordingly, the sound extraction subsystem 150 extracts an extraction-signal time waveform from the mixture-signal time waveform and the variable-length onomatopoeia text. Further, the sound extraction subsystem 150 outputs the extraction-signal time waveform.

With such a basic configuration, even when a range of a sound which a user wants to extract as a certain type of event cannot be strictly defined in advance, the sound extraction system 100 can accurately extract (extract or emphasize), from mixture signals, a signal corresponding to the sound which the user wants to extract.

A definition of a type of event as used in Non-Patent Literature 1 described above differs depending on an application site, and it is rare that the range of the sound which the user wants to extract matches a type of event defined in advance. When the range of the sound which the user wants to extract does not match the type of event defined in advance, a sound which the user wants to extract cannot be extracted. On the other hand, since onomatopoeia has relatively high versatility, there is a high possibility that the onomatopoeia can be used across the application site.

Further, as processing of outputting an environmental sound in response to an input of onomatopoeia, a technique disclosed in Patent Literature 1 described above is known. Patent Literature 1 discloses that "a speech input unit configured to receive a speech signal; a speech recognition unit configured to perform speech recognition processing on the speech signal input to the speech input unit and to generate onomatopoeia; a sound data storage unit which stores an environmental sound and onomatopoeia corresponding to the environmental sound; a correlation information storage unit which stores correlation information in which first onomatopoeia, second onomatopoeia, and a frequency of selecting the second onomatopoeia when the first onomatopoeia is recognized by the speech recognition unit are correlated with each other; a conversion unit configured to convert the first onomatopoeia recognized by the speech recognition unit into the second onomatopoeia corresponding to the first onomatopoeia using the correlation information; and a retrieval and extraction unit configured to extract the environmental sound corresponding to the second onomatopoeia converted by the conversion unit from the sound data storage unit and to rank and present a plurality of candidates of an extracted environmental sound based on frequencies of selecting the plurality of candidates of the extracted environmental sound are included".

However, the technique of Patent Literature 1 cannot extract a sound from mixture sounds. "Extract" in Patent Literature 1 means to perform retrieval from a database and retrieve an environmental sound which matches a condition. The technique of Patent Literature 1 has only a mapping from an environmental sound to onomatopoeia, and does not have a mapping from onomatopoeia to an environmental sound, and therefore, an output sound is only a sound present in the database. Unless the mixture sounds exactly the same as the sound present in the database are input, the sound cannot be extracted from the mixture sounds. In extraction of the sound from the mixture sounds, which is a problem of the invention, it is almost impossible to input the mixture sounds exactly the same as the sound present in the database. Therefore, in Patent Literature 1, the sound cannot be extracted from the mixture sounds.

<Hardware Configuration>

Figure 2:
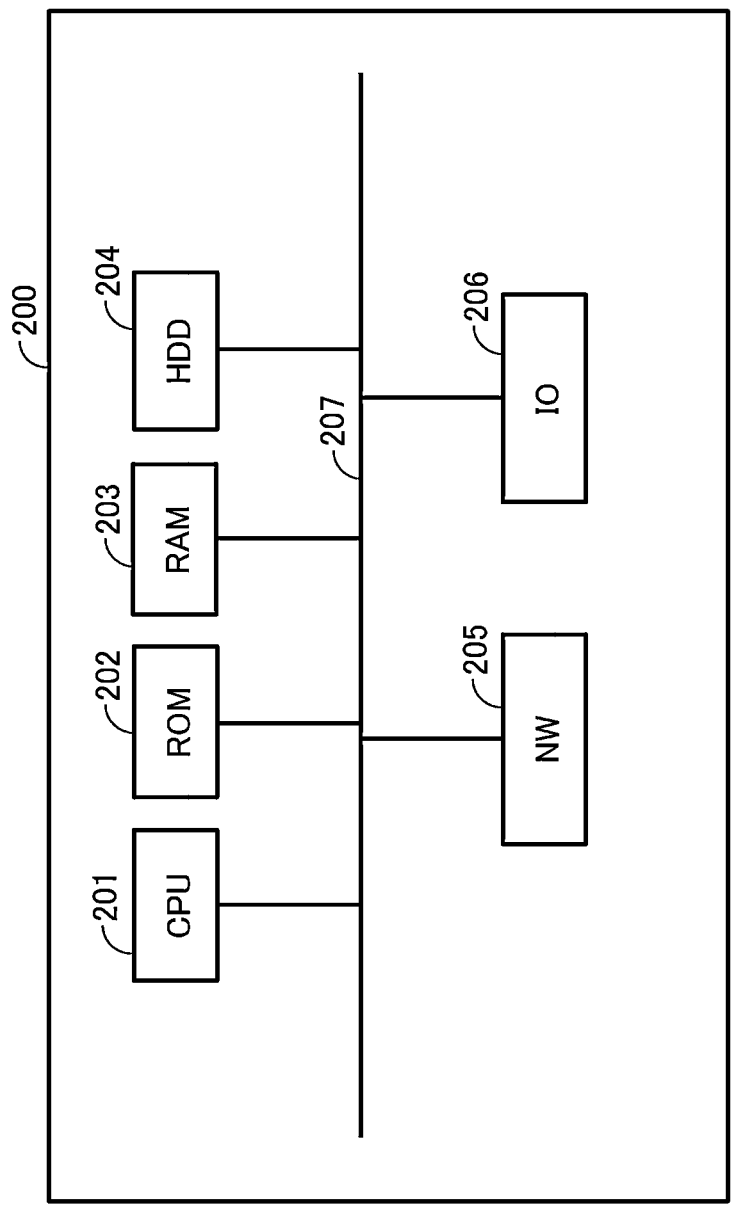
FIG. 2 is a block diagram showing a configuration example of an information processing device.

The sound extraction system 100 can be implemented by, for example, a computer (information processing device). FIG. 2 is a block diagram showing a configuration example of the information processing device. As shown in FIG. 2, an information processing device 200 includes a CPU 201, a ROM 202, a RAM 203, a non-volatile storage device (HDD) 204 from and to which data read and write can be performed, a network interface 205, an input/output interface 206, and the like. These components are communicably connected to one another via a bus 207. The CPU 201 loads various programs (not shown) stored in the ROM 202 and/or the storage device 204 into the RAM 203, and executes the programs loaded into the RAM 203, thereby implementing various functions. As described above, the various programs executed by the CPU 201 are loaded into the RAM 203, and data used when the CPU 201 executes the various programs is temporarily stored in the RAM 203. The ROM 202 and/or the storage device 204 are non-volatile storage media, and stores various programs. The network interface 205 is an interface for connecting the information processing device 200 to a network. The input/output interface 206 is an interface to be connected to an operation device such as a keyboard and a mouse, an acoustic device such as a microphone, and a display device such as a display.

For example, the training data set database 160 of the sound extraction system 100 is implemented by a database stored in the storage device 204 in the information processing device 200. The learning subsystem 110 of the sound extraction system 100 is implemented by the information processing device 200. The feature extraction model database 120, the text-embedded extraction model database 130, and the time-frequency mask generation model database 140 of the sound extraction system 100 are implemented by databases stored in the storage device 204 in the information processing device 200. The sound extraction subsystem 150 of the sound extraction system 100 is implemented by the information processing device 200. The information processing device 200 constituting one system or the like may be a plurality of information processing devices or a virtual information processing device constructed on a cloud.

<Learning Subsystem>

(Function of Learning Subsystem)

Figure 3:
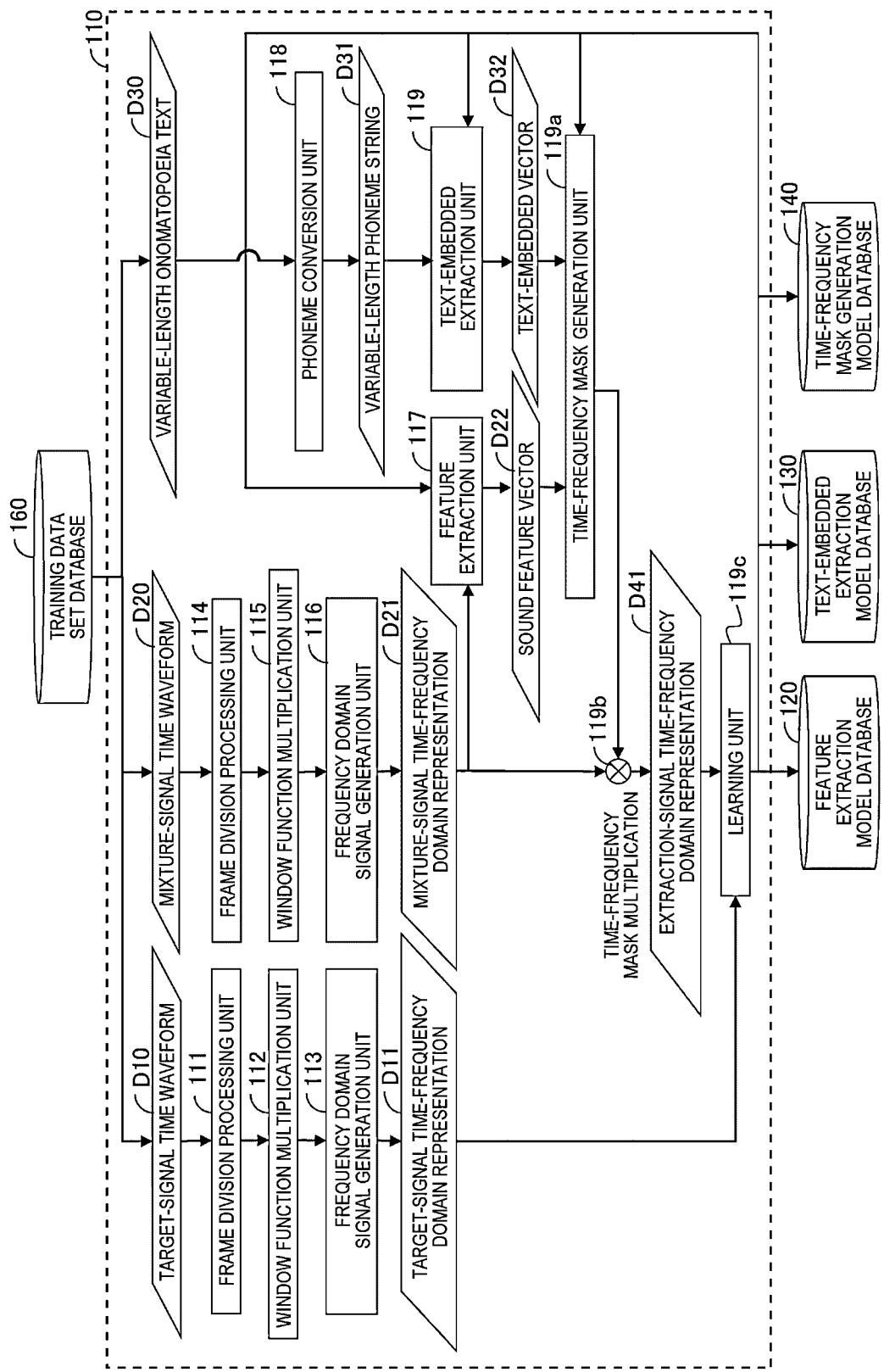
FIG. 3 is a block diagram showing a configuration example of a learning subsystem for each function.

Hereinafter, a configuration of the learning subsystem 110 will be described mainly for each function. FIG. 3 is a block diagram showing a configuration example of the learning subsystem 110 for each function. As shown in FIG. 3, the learning subsystem 110 includes a target-signal frame division processing unit 111, a target-signal window function multiplication unit 112, a target-signal frequency domain signal generation unit 113, a mixture-signal frame division processing unit 114, a mixture-signal window function multiplication unit 115, a mixture-signal frequency domain signal generation unit 116, a feature extraction unit 117, a phoneme conversion unit 118, a text-embedded extraction unit 119, a time-frequency mask generation unit 119a, a time-frequency mask multiplication unit 119b, and a learning unit 119c. The target-signal frame division processing unit 111, the target-signal window function multiplication unit 112, the target-signal frequency domain signal generation unit 113, the mixture-signal frame division processing unit 114, the mixture-signal window function multiplication unit 115, the mixture-signal frequency domain signal generation unit 116, the feature extraction unit 117, the phoneme conversion unit 118, the text-embedded extraction unit 119, the time-frequency mask generation unit 119a, the time-frequency mask multiplication unit 119b, and the learning unit 119c are implemented by various programs (not shown) stored in the ROM 202 and/or in the storage device 204 of the information processing device 200.

The target-signal frame division processing unit 111 performs frame division of a target-signal time waveform D10, and outputs a target-signal frame division signal (not shown). The target-signal window function multiplication unit 112 performs window function multiplication, and converts the target-signal frame division signal into a target-signal window function multiplication signal (not shown).

The target-signal frequency domain signal generation unit 113 performs short-time Fourier transform, and converts the target-signal window function multiplication signal into a target-signal time-frequency domain representation D11. The target-signal frequency domain signal generation unit 113 may use a frequency transform method such as "constant Q transform (CQT)" instead of the short-time Fourier transform.

The mixture-signal frame division processing unit 114 performs frame division of the mixture-signal time waveform D20, and outputs a mixture-signal frame division signal (not shown).

The mixture-signal window function multiplication unit 115 performs window function multiplication, and converts the mixture-signal frame division signal into a mixture-signal window function multiplication signal (not shown). The mixture-signal frequency domain signal generation unit 116 performs short-time Fourier transform, and converts the mixture-signal window function multiplication signal into a mixture-signal time-frequency domain representation D21. The mixture-signal frequency domain signal generation unit may use the frequency transform method such as the "constant Q transform (CQT)" instead of the short-time Fourier transform.

The feature extraction unit 117 converts the mixture-signal time-frequency domain representation D21 into a sound feature vector D22. In the present example, the feature extraction unit 117 uses a feature extraction model which is a neural network having a variable weighting factor parameter. The feature extraction unit 117 inputs the mixture-signal time-frequency domain representation D21 to a latest feature extraction model updated immediately before, and outputs the sound feature vector D22. The feature extraction model may be, for example, a neural network in which a plurality of convolution layers, activation functions, and pooling layers are stacked with a skip connection interposed thereamong.

The sound feature vector D22 may be an amplitude spectrogram of the time-frequency domain representation D21. In this case, the feature extraction unit 117 calculates an amplitude spectrogram (vector) of the time-frequency domain representation D21. In this case, the weighting factor parameter used for the calculation is invariable. For example, the sound feature vector may be a power spectrogram of the time-frequency domain representation D21. In this case, the feature extraction unit 117 calculates a power spectrogram (vector) of the time-frequency domain representation D21. In this case, the weighting factor parameter used for the calculation is invariable. For example, the sound feature vector D22 may be a logarithmic mel power spectrogram of the time-frequency domain representation D21. In this case, the feature extraction unit 117 calculates a power spectrogram of the time-frequency domain representation D21, calculates a mel power spectrogram by multiplying the obtained power spectrogram by a mel filter bank, and performs logarithm on the obtained mel power spectrogram, thereby outputting a logarithmic mel power spectrogram (vector). In this case, the weighting factor parameter used for the calculation is invariable. A filter bank such as a ⅓ octave band filter may be used instead of the mel filter bank.

Further, the sound feature vector D22 may be a time series of a mel frequency cepstrum coefficient (MFCC) instead of the logarithmic mel power spectrogram. In that case, the feature extraction unit 117 calculates a logarithmic value of the power spectrogram, multiplies the logarithmic value by the filter bank, performs discrete cosine transform, and outputs a time series (vector) of the MFCC. In this case, the weighting factor parameter used for the calculation is invariable.

The sound feature vector D22 may be a time difference with respect to a logarithmic mel power spectrogram or a time difference of the MFCC, a time series (delta) of time differentiation, or a concatenated vector thereof. In any of these cases, the weighting factor parameter used for the calculation is invariable.

The phoneme conversion unit 118 outputs a variable-length phoneme string D31 from a variable-length onomatopoeia text D30 by phoneme conversion processing. For example, when the onomatopoeia text D30 is "clang-clang", "/kaNkaN/" is output as the phoneme string D31. When the onomatopoeia text D30 is "clang-clang boom", "/katakatado:N/" is output as the phoneme string D31.

The text-embedded extraction unit 119 outputs, using a latest text-embedded extraction model, a text-embedded vector D32 from the phoneme string D31. The text-embedded vector D32 is a vector having a predetermined number of dimensions Ds. First, the text-embedded extraction unit 119 assigns a one-hot vector to each phoneme in the input phoneme string D31 to obtain a one-hot vector sequence. The one-hot vector here is a vector in which 1 is assigned only to a dimension corresponding to a type of phoneme ("/a/, /i/, /u/, /e/, /o/, /k/, /s/, /N/", and the like) as a conversion target, and 0 is assigned to the other dimensions. Next, the one-hot vector sequence is input to the text-embedded extraction model, and the text-embedded vector D32 is output. The text-embedded extraction model may be a known Transformer model, or a recurrent neural network with layers such as long-short-term-memory (LSTM), bidirectional LSTM, gated recurrent unit (GRU), and bidirectional GRU.

The time-frequency mask generation unit 119a generates, using a latest time-frequency mask generation model, a time-frequency mask from the sound feature vector D22 and the text-embedded vector D32.

The time-frequency mask is an estimate of what ratio of amplitudes of the mixture signals is an extraction signal at each time-frequency in a time-frequency domain representation. That is, the time-frequency mask takes a value larger than 0 and smaller than 1 at each time-frequency. The closer to 1, the larger portion of the amplitudes of the mixture signals are the extraction signal, and the closer to 0, the larger portion of the amplitudes of the mixture signals are components other than the extraction signal.

The time-frequency mask generation model is a neural network which generates a time-frequency mask by using the sound feature vector D22 and the text-embedded vector D32 as inputs. For example, the neural network may have a plurality of convolution layers, activation functions, and pooling layers stacked with a skip connection interposed thereamong. In particular, when the sound feature vector D22 is an amplitude spectrogram or a power spectrogram, the time-frequency mask generation unit 119a may be, for example, conditional U-Net. That is, a sound feature vector which is an amplitude spectrogram or a power spectrogram is considered as an image, the image is input to a U-Net encoder implemented by stacking K convolution layers as an input, a U-Net feature map is calculated, the obtained U-Net feature map and the text-embedded vector D32 are input to a U-Net decoder implemented by stacking K convolution layers, and a time-frequency mask which is an image having the same number of pixels as the sound feature vector D22 is output. Each convolution layer k=1, . . . , K of the U-Net encoder outputs a feature map V_k having different time-frequency resolutions from each other corresponding to that layer. The U-Net feature map is obtained by connecting the feature maps V_1, V_2, . . . , V_K for all convolution layers. Each convolution layer k=1, . . . , K of the U-Net decoder receives V_K−k+1 in the U-Net feature map and the text-embedded vector D32 as inputs. Alternatively, only the convolution layer k=1 may receive the feature map V_K and the text-embedded vector D32 as the inputs, and other convolution layers k≠1 may receive only the feature map V_K−k+1 as an input without the text-embedded vector D32 as an input. If each convolution layer of the U-Net decoder receives the text-embedded vector D32 as the input, there is an advantage that accuracy is increased if a training data set is abundant. When only the convolution layer k=1 receives the text-embedded vector D32 as the input, there is an advantage that the number of weighting factors of the neural network is reduced to be small.

The time-frequency mask multiplication unit 119b multiplies the mixture-signal time-frequency domain representation D21 by the time-frequency mask to generate an extraction-signal time-frequency domain representation D41.

The learning unit 119c minimizes a value of a loss function defined by a distance between the extraction-signal time-frequency domain representation D41 and the target-signal time-frequency domain representation D11 to learn parameters of the feature extraction model, the text-embedded extraction model, and the time-frequency mask generation model.

The learning unit 119c further calculates a convergence determination function used for determining whether convergence occurs. For example, the convergence determination function is defined by a magnitude of a change in the value of the loss function from a previous iteration (training). The convergence determination function may be defined by a magnitude of a change from a previous iteration (training) of a parameter of the feature extraction model, a magnitude of a change from a previous iteration (training) of a parameter of the text-embedded extraction model, a magnitude of a change from a previous iteration (training) of a parameter of the time-frequency mask generation model, or a product of these magnitudes of the changes. If the change is sufficiently small, it is determined that convergence occurs. For example, if the convergence determination function is smaller than a predetermined threshold value, it is determined that convergence occurs.

(Outline of Operation)

An outline of an operation of the learning subsystem 110 will be described. The learning subsystem 110 reads out, from the training data set database 160, a set of three items of "the target-signal time waveform D10, the mixture-signal time waveform D20 obtained by mixing the target-signal time waveform and a signal corresponding to noise other than the target signal, and the variable-length onomatopoeia text D30".

The target-signal time waveform D10 is sequentially input to the target-signal frame division processing unit 111, the target-signal window function multiplication unit 112, and the target-signal frequency domain signal generation unit 113, and is converted into the target-signal time-frequency domain representation D11.

The mixture-signal time waveform D20 is sequentially input to the mixture-signal frame division processing unit 114, the mixture-signal window function multiplication unit 115, and the mixture-signal frequency domain signal generation unit 116, and is converted into the mixture-signal time-frequency domain representation D21.

The mixture-signal time-frequency domain representation D21 is input to the feature extraction unit 117, and is converted into the sound feature vector D22.

The variable-length onomatopoeia text D30 is input to the phoneme conversion unit 118, and is converted into the variable-length phoneme string D31. The variable-length phoneme string D31 is input to the text-embedded extraction unit 119, and is converted into the text-embedded vector D32.

The sound feature vector D22 and the text-embedded vector D32 are input to the time-frequency mask generation unit 119a to generate a time-frequency mask.

The mixture-signal time-frequency domain representation D21 and the time-frequency mask are multiplied in the time-frequency mask multiplication unit 119b to generate the extraction-signal time-frequency domain representation D41. The extraction-signal time-frequency domain representation D41 is input to the learning unit 119c.

The target-signal time-frequency domain representation D11 and the extraction-signal time-frequency domain representation D41 are input to the learning unit 119c. The learning unit 119c learns parameters of the feature extraction model, the text-embedded extraction model, and the time-frequency mask generation model, and updates the parameters. The feature extraction model, the text-embedded extraction model, and the time-frequency mask generation model in which the parameters are updated are stored in the feature extraction model database 120, the text-embedded extraction model database 130, and the time-frequency mask generation model database 140, respectively. The feature extraction model, the text-embedded extraction model, and the time-frequency mask generation model in which the parameters are updated are also referred to as "trained models" for convenience.

(Specific Operation)

Figure 4:
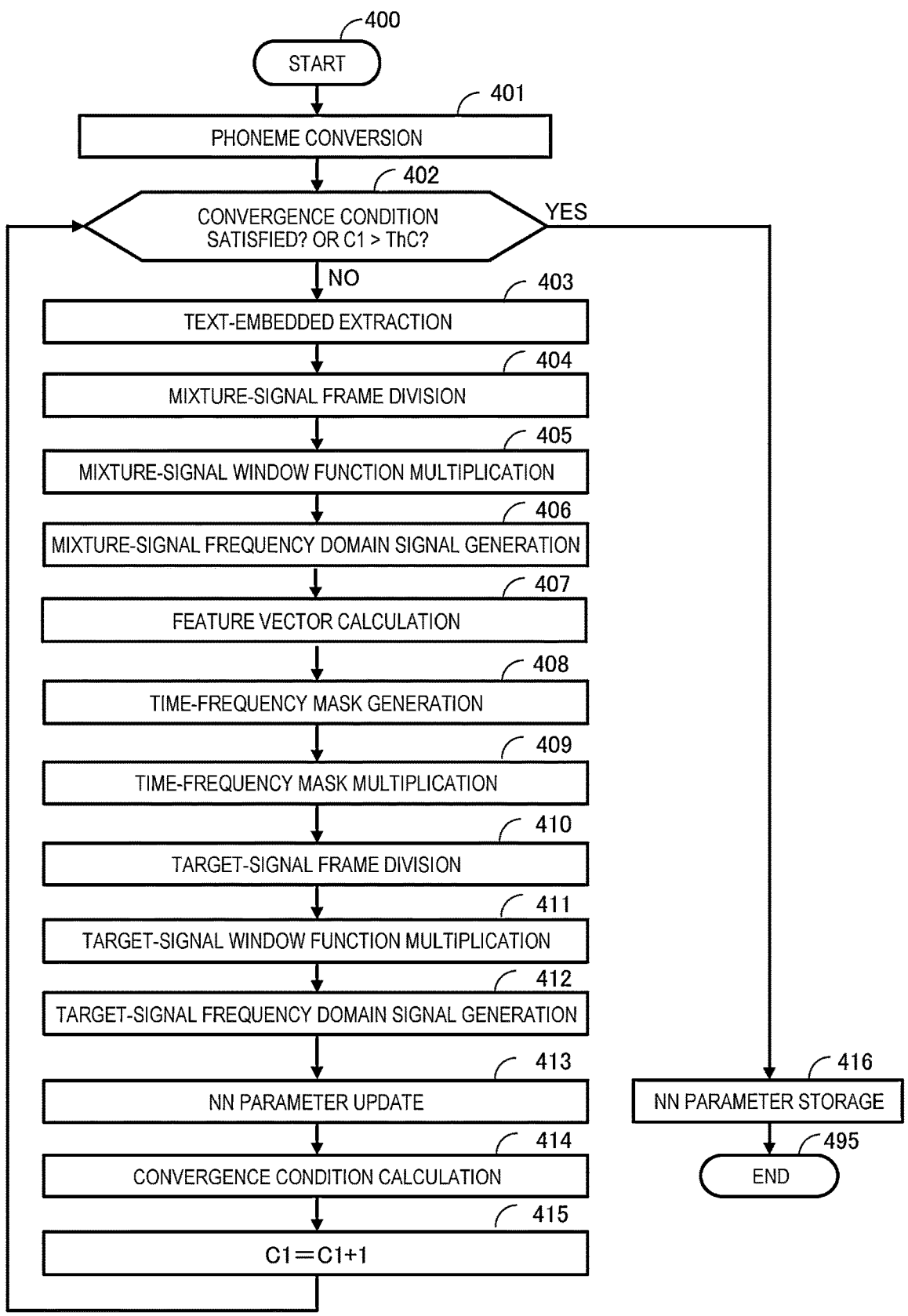
FIG. 4 is a flowchart showing an example of a processing flow of the learning subsystem.

A specific operation of the learning subsystem 110 will be described. FIG. 4 is an example of a processing flow of the learning subsystem 110. The learning subsystem 110 executes the processing flow of FIG. 4. When the learning subsystem 110 reads out, from the training data set database 160, a set of three items including the target-signal time waveform D10, the mixture-signal time waveform D20, and the variable-length onomatopoeia text D30, the learning subsystem 110 starts processing from step 400 in FIG. 4 and proceeds to step 401. When the learning subsystem 110 proceeds to step 401, the learning subsystem 110 calculates, by the phoneme conversion unit 118, the variable-length phoneme string D31 from the variable-length onomatopoeia text D30 by phoneme conversion processing (converts the onomatopoeia text D30 into the phoneme string D31).

Thereafter, the learning subsystem 110 proceeds to step 402, and determines whether a learning end condition is satisfied. The learning end condition is a condition which is satisfied when either a condition 1 or a condition 2 described below is satisfied. The condition 1 is satisfied when a predetermined convergence condition is satisfied (for example, when the convergence determination function is smaller than a predetermined threshold value). The condition 2 is satisfied when a counter C1 is larger than a threshold value ThC (C1>ThC). The learning end condition may be only the condition 2.

When the learning end condition is not satisfied, the learning subsystem 110 determines "NO" in step 402, sequentially executes processing of steps 403 to 415 described below, and then returns to step 402.

Step 403: The learning subsystem 110 calculates (extracts), by the text-embedded extraction unit 119, the text-embedded vector D32 from the phoneme string D31 using a latest text-embedded extraction model.

Step 404: The learning subsystem 110 performs, by the mixture-signal frame division processing unit 114, frame division of the mixture-signal time waveform D20, and calculates (outputs) a mixture-signal frame division signal.

Step 405: The learning subsystem 110 performs, by the mixture-signal window function multiplication unit 115, window function multiplication, and converts the mixture-signal frame division signal into a mixture-signal window function multiplication signal.

Step 406: The learning subsystem 110 converts, by the mixture-signal frequency domain signal generation unit 116, the mixture-signal window function multiplication signal into the mixture-signal time-frequency domain representation D21.

Step 407: The learning subsystem 110 calculates, by the feature extraction unit 117, the sound feature vector D22 from the mixture-signal time-frequency domain representation D21. In the present example, the learning subsystem 110 calculates, by the feature extraction unit 117, the sound feature vector D22 from the mixture-signal time-frequency domain representation D21 using a latest feature extraction model.

Step 408: The learning subsystem 110 generates, by the time-frequency mask generation unit 119a, the time-frequency mask from the sound feature vector D22 and the text-embedded vector D32 using a latest time-frequency mask generation model.

Step 409: The learning subsystem 110 multiplies, by the time-frequency mask multiplication unit 119b, the mixture-signal time-frequency domain representation D21 by the time-frequency mask to generate the extraction-signal time-frequency domain representation D41.

Step 410: The learning subsystem 110 performs, by the target-signal frame division processing unit 111, frame division of the target-signal time waveform D10, and calculates (outputs) the target-signal frame division signal.

Step 411: The learning subsystem 110 performs, by the target-signal window function multiplication unit 112, window function multiplication, and converts the target-signal frame division signal into the target-signal window function multiplication signal.

Step 412: The learning subsystem 110 performs, by the target-signal frequency domain signal generation unit 113, short-time Fourier transform, and converts the target-signal window function multiplication signal into the target-signal time-frequency domain representation D11.

Step 413: The learning subsystem 110 minimizes, by the learning unit 119c, the value of the loss function defined by the distance between the extraction-signal time-frequency domain representation D41 and the target-signal time-frequency domain representation D11 to learn parameters of the feature extraction model, the text-embedded extraction model, and the time-frequency mask generation model (parameters of the neural networks (NNs)) (that is, update each model).

Step 414: The learning subsystem 110 calculates, by the learning unit 119c, a convergence condition indicating whether convergence occurs. The convergence condition is defined by, for example, a magnitude of a change from a previous iteration (training) of the loss function. Alternatively, the convergence condition is defined by a magnitude of a change from a previous iteration (training) of the parameters of the feature extraction model, the text-embedded extraction model, and the time-frequency mask generation model. When the change is sufficiently small, it is determined that convergence occurs (step 402).

Step 415: The learning subsystem 110 increases a current value of the counter C1 by "1".

When the learning end condition is satisfied in step 402, the learning subsystem 110 determines "YES" in step 402 and proceeds to step 416 to store the feature extraction model, the text-embedded extraction model, and the time-frequency mask generation model (parameters of the neural networks (NNs)) in the respective databases (the feature extraction model database 120, the text-embedded extraction model database 130, and the time-frequency mask generation model database 140). Thereafter, the learning subsystem 110 proceeds to step 495 and temporarily ends the processing flow.

<Sound Extraction Subsystem>
(Function of Sound Extraction Subsystem)

Figure 5:
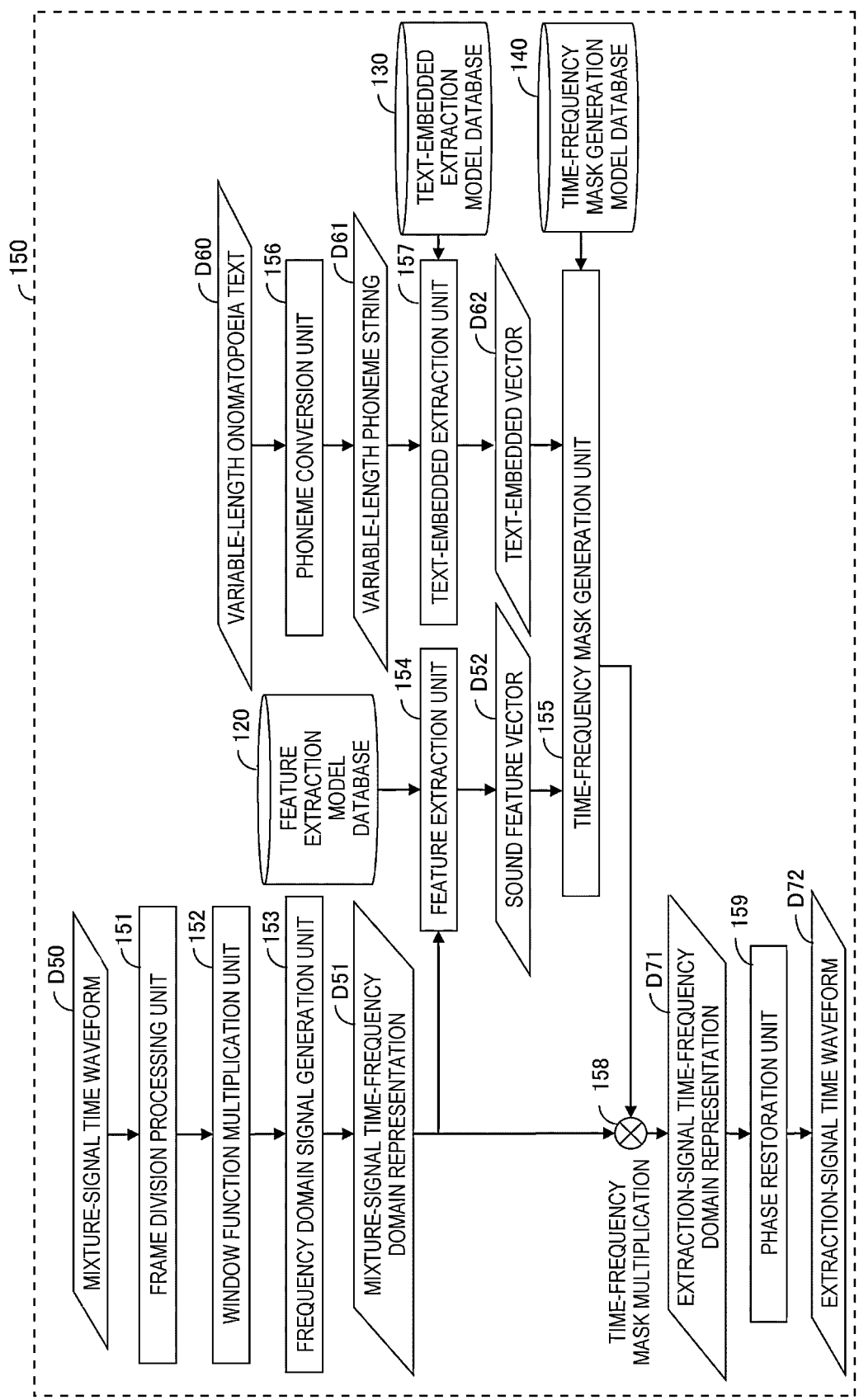
FIG. 5 is a block diagram showing a configuration example of a sound extraction subsystem for each function.

A configuration of the sound extraction subsystem 150 will be described mainly for each function. FIG. 5 is a block diagram showing a configuration example of the sound extraction subsystem 150 for each function.

As shown in FIG. 5, the sound extraction subsystem 150 includes a mixture-signal frame division processing unit 151, a mixture-signal window function multiplication unit 152, a mixture-signal frequency domain signal generation unit 153, a feature extraction unit 154, a time-frequency mask generation unit 155, a phoneme conversion unit 156, a text-embedded extraction unit 157, a time-frequency mask multiplication unit 158, and a phase restoration unit 159. The mixture-signal frame division processing unit 151, the mixture-signal window function multiplication unit 152, the mixture-signal frequency domain signal generation unit 153, the feature extraction unit 154, the time-frequency mask generation unit 155, the phoneme conversion unit 156, the text-embedded extraction unit 157, the time-frequency mask multiplication unit 158, and the phase restoration unit 159 are implemented by various programs (not shown) stored in the ROM 202 and/or in the storage device 204 of the information processing device 200.

The mixture-signal frame division processing unit 151 performs frame division of a mixture-signal time waveform D50, and calculates (outputs) a mixture-signal frame division signal (not shown). The mixture-signal window function multiplication unit 152 performs window function multiplication and converts the mixture-signal frame division signal into a mixture-signal window function multiplication signal (not shown).

The mixture-signal frequency domain signal generation unit 153 performs short-time Fourier transform, and converts the mixture-signal window function multiplication signal into a mixture-signal time-frequency domain representation D51. The frequency transform method such as the CQT may be used instead of the short-time Fourier transform, and the same processing as that of the learning subsystem 110 is performed.

In the present example, similarly to the learning subsystem 110, the feature extraction unit 154 converts the mixture-signal time-frequency domain representation D51 into a sound feature vector using a latest feature extraction model (a feature extraction model which is a neural network in which the weighting factor parameter is variable). The mixture-signal time-frequency domain representation D51 is input to the latest feature extraction model of the learning subsystem 110 updated immediately before, and a sound feature vector is calculated. When the learning subsystem 110 uses a logarithmic mel power spectrogram, a time series of the MFCC, a connection of delta or delta delta with respect to the logarithmic mel power spectrogram and the time series of the MFCC, or the like, the feature vector here may be a logarithmic mel power spectrogram, a time series of the MFCC, a connection of delta or delta-delta with respect to the logarithmic mel power spectrogram and the time series of the MFCC, or the like corresponding to that used in the learning subsystem 110. In this case, the feature extraction unit 154 performs similar processing as the feature extraction unit 117 of the learning subsystem 110.

The phoneme conversion unit 156 outputs a variable-length phoneme string D61 from a variable-length onomatopoeia text D60 by phoneme conversion processing (converts the onomatopoeia text D60 into the phoneme string D61).

The text-embedded extraction unit 157 calculates (extracts), using a latest text-embedded extraction model, a text-embedded vector D62 from the phoneme string D61.

The time-frequency mask generation unit 155 generates, using a latest time-frequency mask generation model, a time-frequency mask from the sound feature vector D52 and the text-embedded vector D62.

The time-frequency mask multiplication unit 158 multiplies the mixture-signal time-frequency domain representation D51 by the time-frequency mask to generate an extraction-signal time-frequency domain representation D71.

The phase restoration unit 159 generates, using a known Griffin-Lim algorithm or the like, an extraction-signal time waveform D72 from the extraction-signal time-frequency domain representation D71.

(Outline of Operation)

An outline of an operation of the sound extraction subsystem 150 will be described. As shown in FIG. 5, the mixture-signal time waveform D50 is sequentially input to the mixture-signal frame division processing unit 151, the mixture-signal window function multiplication unit 152, and the mixture-signal frequency domain signal generation unit 153, and is converted into the mixture-signal time-frequency domain representation D51. The mixture-signal time-frequency domain representation D51 is input to the feature extraction unit 154, and is converted into the sound feature vector D52.

The variable-length onomatopoeia text D60 is input to the phoneme conversion unit 156, and is converted into the variable-length phoneme string D61. The variable-length phoneme string D61 is input to the text-embedded extraction unit 157, and is converted into the text-embedded vector D62. The sound feature vector D52 and the text-embedded vector D62 are input to the time-frequency mask generation unit 155 to generate the time-frequency mask.

The mixture-signal time-frequency domain representation D51 and the time-frequency mask are multiplied in the time-frequency mask multiplication unit 158 to generate the extraction-signal time-frequency domain representation D71. The extraction-signal time-frequency domain representation D71 is input to the phase restoration unit 159 to generate the extraction-signal time waveform D72.

(Specific Operation)

Figure 6:
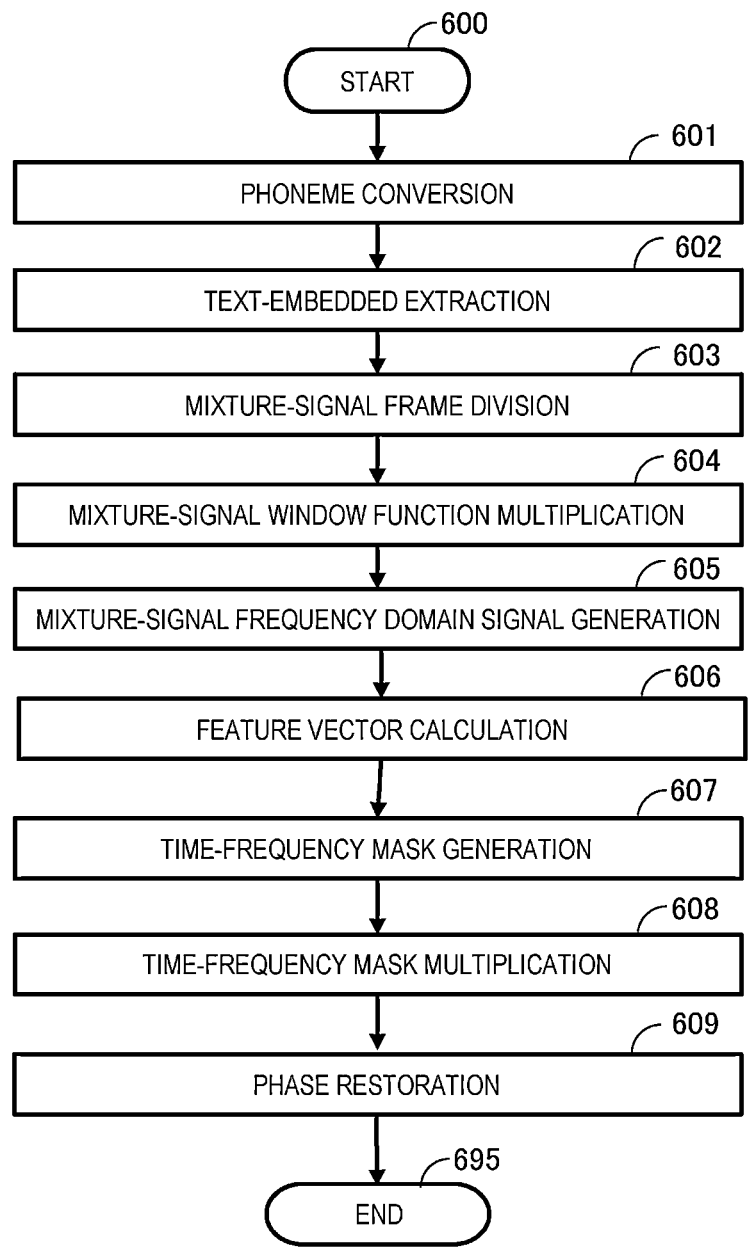
FIG. 6 is a flowchart showing an example of a processing flow of the sound extraction subsystem.

A specific operation of the sound extraction subsystem 150 will be described. FIG. 6 is an example of a processing flow of the sound extraction subsystem 150. The sound extraction subsystem 150 executes the processing flow of FIG. 6. When the mixture-signal time waveform D50 and the variable-length onomatopoeia text D60 are input, the sound extraction subsystem 150 starts processing from step 600 in FIG. 6, sequentially executes processing of steps 601 to 609 described below, and then proceeds to step 695 and temporarily ends the processing flow.

Step 601: The sound extraction subsystem 150 outputs, by the phoneme conversion unit 156, the variable-length phoneme string D61 from the variable-length onomatopoeia text D60 by phoneme conversion processing (converts the onomatopoeia text D60 into the phoneme string D61).

Step 602: The sound extraction subsystem 150 calculates (extracts), by the text-embedded extraction unit 157, the text-embedded vector D62 from the phoneme string D61 using a latest text-embedded extraction model.

Step 603: The sound extraction subsystem 150 performs, by the mixture-signal frame division processing unit 151, frame division of the mixture-signal time waveform D50, and calculates (outputs) the mixture-signal frame division signal.

Step 604: The sound extraction subsystem 150 performs, by the mixture-signal window function multiplication unit 152, window function multiplication, and converts the mixture-signal frame division signal into the mixture-signal window function multiplication signal.

Step 605: The sound extraction subsystem 150 performs, by the mixture-signal frequency domain signal generation unit 153, short-time Fourier transform, and converts the mixture-signal window function multiplication signal into the mixture-signal time-frequency domain representation D51.

Step 606: The sound extraction subsystem 150 calculates, by the feature extraction unit 154, the sound feature vector D52 from the mixture-signal time-frequency domain representation D51. In the present example, the sound extraction subsystem 150 calculates, by the feature extraction unit 154, the sound feature vector D52 from the mixture-signal time-frequency domain representation D51 using a latest feature extraction model.

Step 607: The sound extraction subsystem 150 generates, by the time-frequency mask generation unit 155, the time-frequency mask from the sound feature vector D52 and the text-embedded vector D62 using a latest time-frequency mask generation model.

Step 608: The sound extraction subsystem 150 multiplies, by the time-frequency mask multiplication unit 158, the mixture-signal time-frequency domain representation D51 by the time-frequency mask to generate the extraction-signal time-frequency domain representation D71.

Step 609: The sound extraction subsystem 150 generates, by the phase restoration unit 159, the extraction-signal time waveform D72 from the extraction-signal time-frequency domain representation D71 using the known Griffin-Lim algorithm or the like.

EXAMPLE

Figure 7:
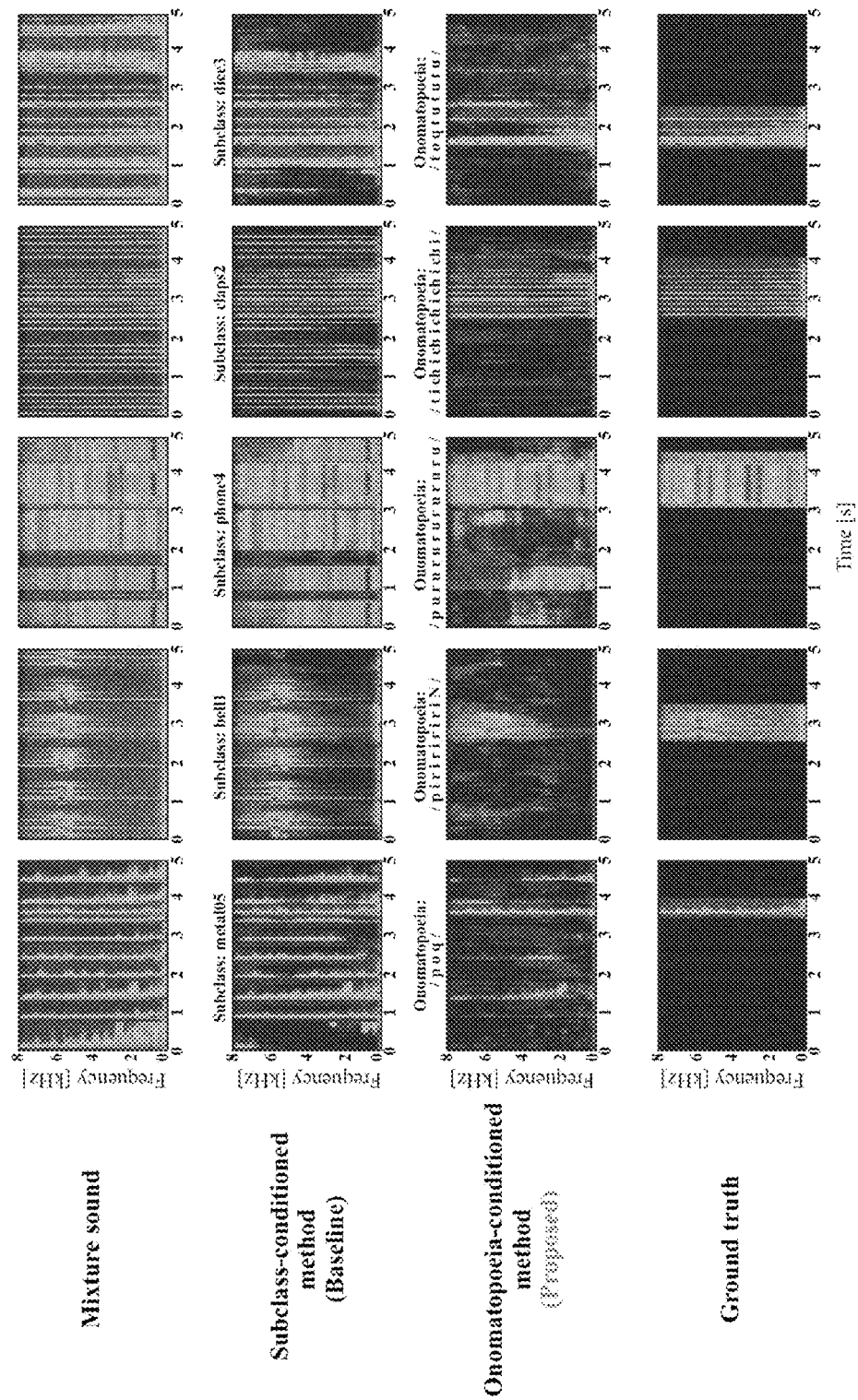
FIG. 7 is data showing an example of extraction results of the sound extraction system.

FIG. 7 shows an example of extraction results of the sound extraction system 100. A top row is power spectrograms of mixture signals. A horizontal axis represents time (seconds), and a vertical axis represents frequency (kHz). White indicates a time frequency having high power, and black indicates a time frequency having low power. In order to make it easy to understand an effect of the example, input mixture signals are signals obtained by mixing a plurality of sound events of the same type, and a range of a sound which the user wants to extract cannot be defined in advance as a certain type of event, so that extraction cannot be performed by an extraction method based on a type of event in the related art (that is, a related-art method corresponding to the related-art technique).

A first column represents a task of extracting only a target signal corresponding to onomatopoeia "/poq/" from mixture signals obtained by mixing a plurality of metallic sounds. A second column represents a task of extracting only a target signal corresponding to onomatopoeia "/piriririri N/" from mixture signals obtained by mixing a plurality of bell sounds. A third column represents a task of extracting only a target signal corresponding to onomatopoeia "/pururururururu/" from mixture signals obtained by mixing a plurality of telephone rings. A fourth column represents a task of extracting only a target signal corresponding to onomatopoeia "/tichichichichichi/" from mixture signals obtained by mixing a plurality of hammering sounds. A fifth column represents a task of extracting only a target signal corresponding to onomatopoeia "/toqtututu/" from mixture signals obtained by mixing a plurality of sounds obtained by rolling a dice.

In each column, a first row ("Mixture sound") indicates input mixture signals, a second row ("Subclass-conditioned method") indicates a result of an extraction method based on a type of event, a third row ("Onomatopoeia-conditioned method") indicates a result of the extraction method of the present example, and a fourth row ("Ground truth") indicates a target signal assumed to be correct. As compared with the mixture signals (first row) and the related-art method (second row), it can be seen that the extraction result (third row) of the present example is similar to the correct target signal (fourth row). Therefore, the present example suggests an effect that a target sound can be extracted even when the range of the sound which the user wants to extract cannot be defined in advance as a certain type of event.

Effects

As described above, the sound extraction system 100 according to the first embodiment of the invention can accurately extract (extract or emphasize), from mixture signals, a signal corresponding to a sound which the user wants to extract. Further, the sound extraction system 100 according to the first embodiment can provide an infinite number of text, and can designate an infinite range of the sound. Therefore, the sound extraction system 100 according to the first embodiment can accurately extract a signal corresponding to a sound which the user wants to extract from mixture signals by providing text corresponding to the sound which the user wants to extract even when the range of the sound which the user wants to extract cannot be defined in advance as a certain type of event.

Second Embodiment

Figure 8:
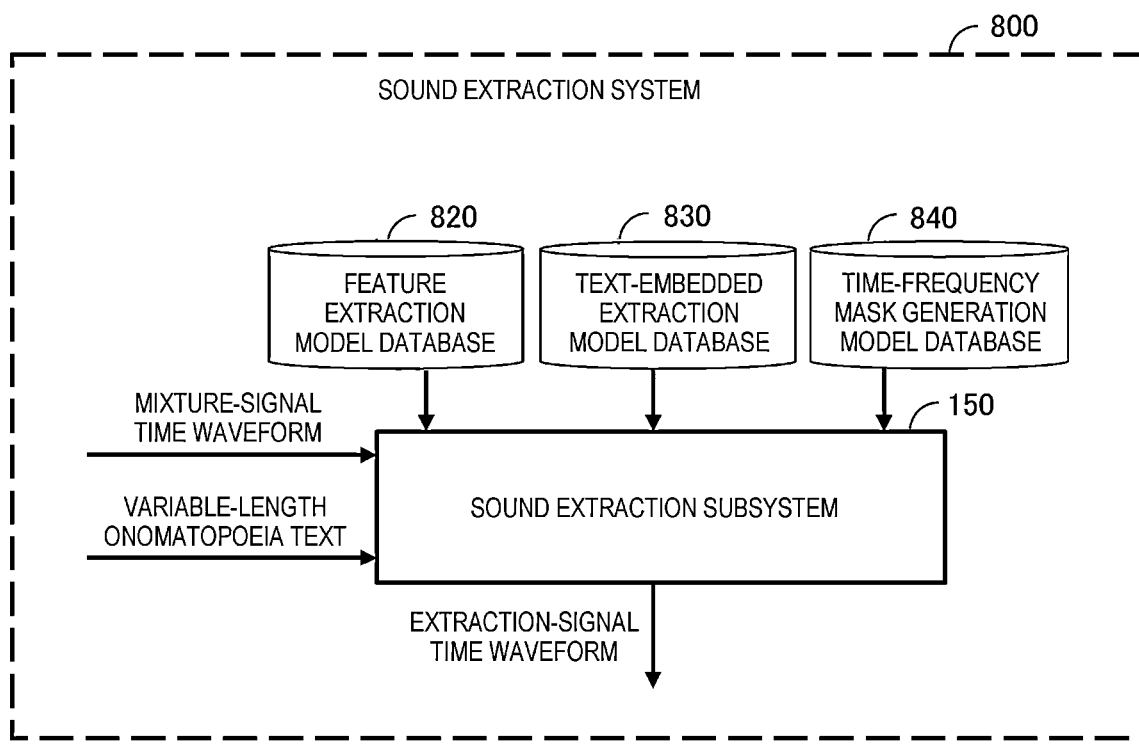
FIG. 8 is a block configuration diagram showing a schematic configuration example of a sound extraction system according to a second embodiment of the invention.

A sound extraction system 800 according to a second embodiment of the invention will be described. FIG. 8 is a block configuration diagram showing a schematic configuration example of the sound extraction system 800 according to the second embodiment of the invention. As shown in FIG. 8, the sound extraction system 800 is different from the sound extraction system 100 according to the first embodiment only in the following points. In the sound extraction system 800, the learning subsystem 110 of the sound extraction system 100 according to the first embodiment is omitted, and a feature extraction model database 820, a text-embedded extraction model database 830, and a time-frequency mask generation model database 840 are used in which a feature extraction model, a text-embedded extraction model, and a time-frequency mask generation model trained in advance based on a general database of correspondence between an environmental sound and onomatopoeia are stored. This difference will be mainly described below.

As shown in FIG. 8, the sound extraction system 800 includes the sound extraction subsystem 150, the feature extraction model database 820, the text-embedded extraction model database 830, the time-frequency mask generation model database 840. When a mixture-signal time waveform and variable-length onomatopoeia text are input, the sound extraction subsystem 150 outputs an extraction-signal time waveform using an existing feature extraction model, text-embedded extraction model, and time-frequency mask generation model. Details of this processing are similar as those of the first embodiment except that the existing feature extraction model, text-embedded extraction model, and time-frequency mask generation model are used, and thus the description thereof will be omitted.

Effects

As described above, similarly to the first embodiment, the sound extraction system 800 according to the second embodiment of the invention can accurately extract (extract or emphasize), from mixture signals, a signal corresponding to a sound which the user wants to extract. Further, since the sound extraction system 800 according to the second embodiment can use the feature extraction model, the text-embedded extraction model, and the time-frequency mask generation model which are trained in advance based on the general database of the correspondence between the environmental sound and the onomatopoeia, new learning processing to be performed by the learning subsystem 110 as in the sound extraction system 100 according to the first embodiment is not required. There is an advantage that it is not required to construct a new training data set for each site.

Third Embodiment

Figure 9:
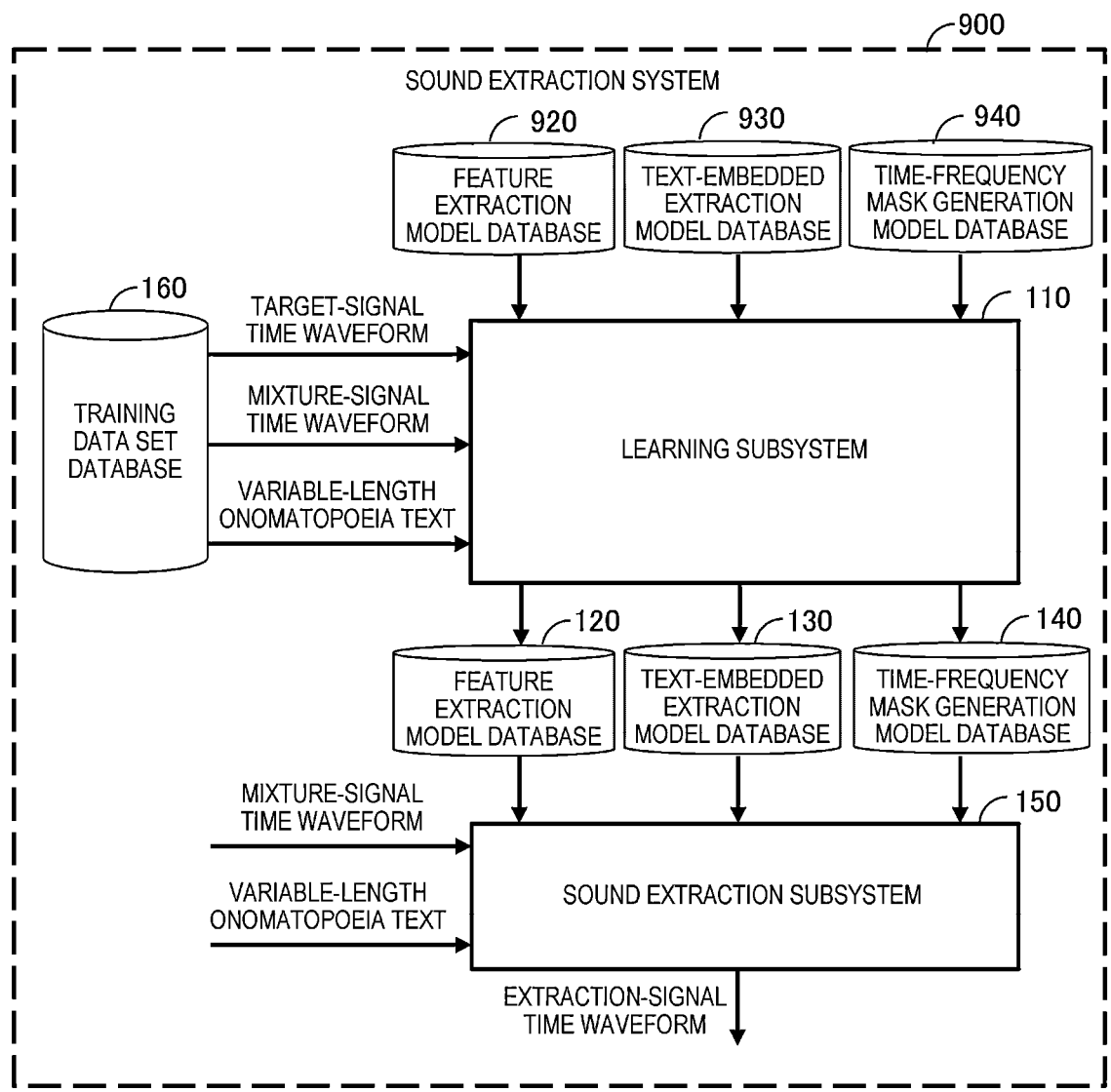
FIG. 9 is a block configuration diagram showing a schematic configuration example of a sound extraction system according to a third embodiment of the invention.

A sound extraction system 900 according to a third embodiment of the invention will be described. FIG. 9 is a block configuration diagram showing a schematic configuration example of the sound extraction system 900 according to the third embodiment of the invention. As shown in FIG. 9, in the sound extraction system 900, the learning subsystem 110 uses a feature extraction model database 920, a text-embedded extraction model database 930, and a time-frequency mask generation model database 940 in which an existing feature extraction model, text-embedded extraction model, and time-frequency mask generation model trained in advance based on a general database of correspondence between an environmental sound and onomatopoeia are stored. The learning subsystem 110 uses a training data set for each site to learn, thereby optimizing a model according to the site and improving accuracy. The sound extraction system 900 according to the third embodiment is different from the sound extraction system 100 according to the first embodiment only in the above points. Therefore, this difference will be mainly described below.

As shown in FIG. 9, the sound extraction system 900 has a configuration in which the feature extraction model database 920, the text-embedded extraction model database 930, and the time-frequency mask generation model database 940 are added with respect to the sound extraction system 100 according to the first embodiment. Existing models stored in the feature extraction model database 920, the text-embedded extraction model database 930, and the time-frequency mask generation model database 940 are also referred to as an "initial feature extraction model, initial text-embedded extraction model, and initial time-frequency mask generation model" for convenience, and are also referred to as "initial trained models".

The learning subsystem 110 uses the training data set for each site to learn, thereby optimizing (updating) the models (the existing feature extraction model, text-embedded extraction model, and time-frequency mask generation model) according to the site, and storing the optimized models in the feature extraction model database 120, the text-embedded extraction model database 130, and the time-frequency mask generation model database 140, respectively.

When a mixture-signal time waveform and variable-length onomatopoeia text are input, the sound extraction subsystem 150 outputs an extraction-signal time waveform using the models obtained by optimizing the existing feature extraction model, text-embedded extraction model, and time-frequency mask generation model. Details of this processing are similar as those of the first embodiment except that the feature extraction model, text-embedded extraction model, and time-frequency mask generation model, which are obtained by optimizing the existing models, are used, and thus the description thereof will be omitted.

Effects

As described above, similarly to the first embodiment, the sound extraction system 900 according to the third embodiment of the invention can accurately extract (extract or emphasize), from mixture signals, a signal corresponding to a sound which the user wants to extract. Further, the sound extraction system 900 according to the third embodiment has an advantage of using an existing model so that a small number of training data sets are newly constructed for each site while improving accuracy of the model according to the site.

Fourth Embodiment

Figure 10:
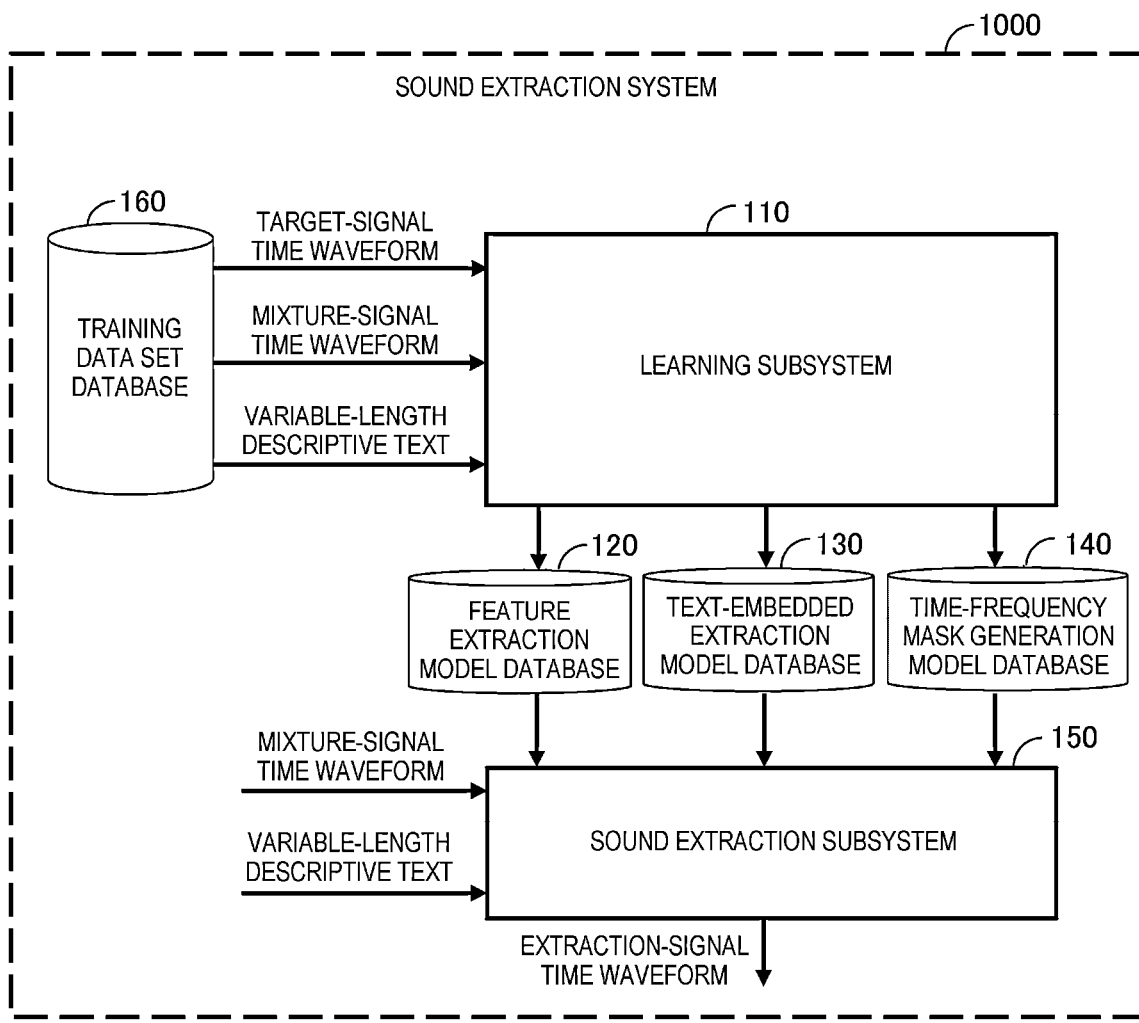
FIG. 10 is a block configuration diagram showing a schematic configuration example of a sound extraction system according to a fourth embodiment of the invention.

A sound extraction system 1000 according to a fourth embodiment of the invention will be described. FIG. 10 is a block configuration diagram showing a schematic configuration example of the sound extraction system 1000 according to the fourth embodiment of the invention. As shown in FIG. 10, the sound extraction system 1000 is different from the sound extraction system 100 according to the first embodiment only in that text such as descriptive text (for example, "clang-clang followed by boom", or "impulsive sound followed by clang-clang") is used as the text representing the range of the sound instead of the onomatopoeia. Therefore, this difference will be mainly described below.

<Learning Subsystem>

(Function of Learning Subsystem)

Figure 11:
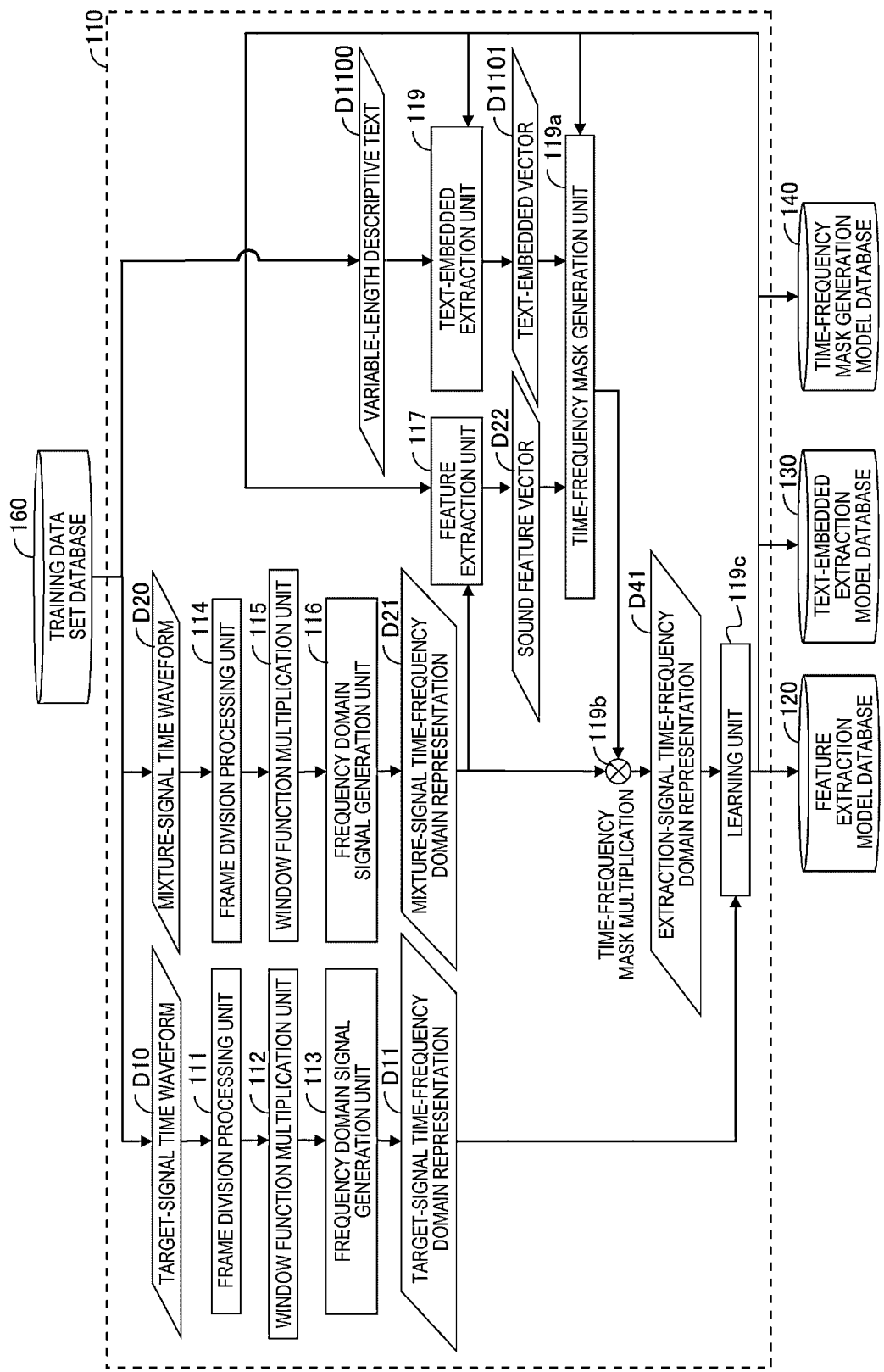
FIG. 11 is a block diagram showing a configuration example of the learning subsystem for each function.

FIG. 11 is a block diagram showing a configuration example of the learning subsystem 110 in the sound extraction system 1000 for each function. As shown in FIG. 11, the learning subsystem 110 includes the target-signal frame division processing unit 111, the target-signal window function multiplication unit 112, the target-signal frequency domain signal generation unit 113, the mixture-signal frame division processing unit 114, the mixture-signal window function multiplication unit 115, the mixture-signal frequency domain signal generation unit 116, the feature extraction unit 117, the text-embedded extraction unit 119, the time-frequency mask generation unit 119a, the time-frequency mask multiplication unit 119b, and the learning unit 119c.

(Outline of Operation)

An outline of an operation of the learning subsystem 110 will be described. The learning subsystem 110 reads out, from the training data set database 160, a set of three items including "the target-signal (signal corresponding to an extraction target sound) time waveform D10, the mixture-signal time waveform D20 obtained by mixing the target-signal time waveform and a signal corresponding to noise other than the target signal (noise other than the extraction target sound), and a variable-length descriptive text D1100 (descriptive text corresponding to the extraction target sound)".

The target-signal time waveform D10 is sequentially input to the target-signal frame division processing unit 111, the target-signal window function multiplication unit 112, and the target-signal frequency domain signal generation unit 113, and is converted into the target-signal time-frequency domain representation D11.

The mixture-signal time waveform D20 is sequentially input to the mixture-signal frame division processing unit 114, the mixture-signal window function multiplication unit 115, and the mixture-signal frequency domain signal generation unit 116, and is converted into the mixture-signal time-frequency domain representation D21.

The mixture-signal time-frequency domain representation D21 is input to the feature extraction unit 117, and is converted into the sound feature vector D22.

The variable-length descriptive text D1100 is input to the text-embedded extraction unit 119, and is converted into an embedded vector D1101 of the descriptive text D1100 (text-embedded vector D1101).

The sound feature vector D22 and the text-embedded vector D1101 are input to the time-frequency mask generation unit 119a to generate a time-frequency mask.

The mixture-signal time-frequency domain representation D21 and the time-frequency mask are multiplied in the time-frequency mask multiplication unit 119b to generate the extraction-signal time-frequency domain representation D41.

When the target-signal time-frequency domain representation D11 and the extraction-signal time-frequency domain representation D41 are input to the learning unit 119c, the learning unit 119c learns parameters of the feature extraction model, the text-embedded extraction model, and the time-frequency mask generation model, and the parameters are updated.

The feature extraction model, the text-embedded extraction model, and the time-frequency mask generation model in which parameters are updated are stored in the feature extraction model database 120, the text-embedded extraction model database 130, and the time-frequency mask generation model database 140, respectively.

(Specific Operation)

Figure 12:
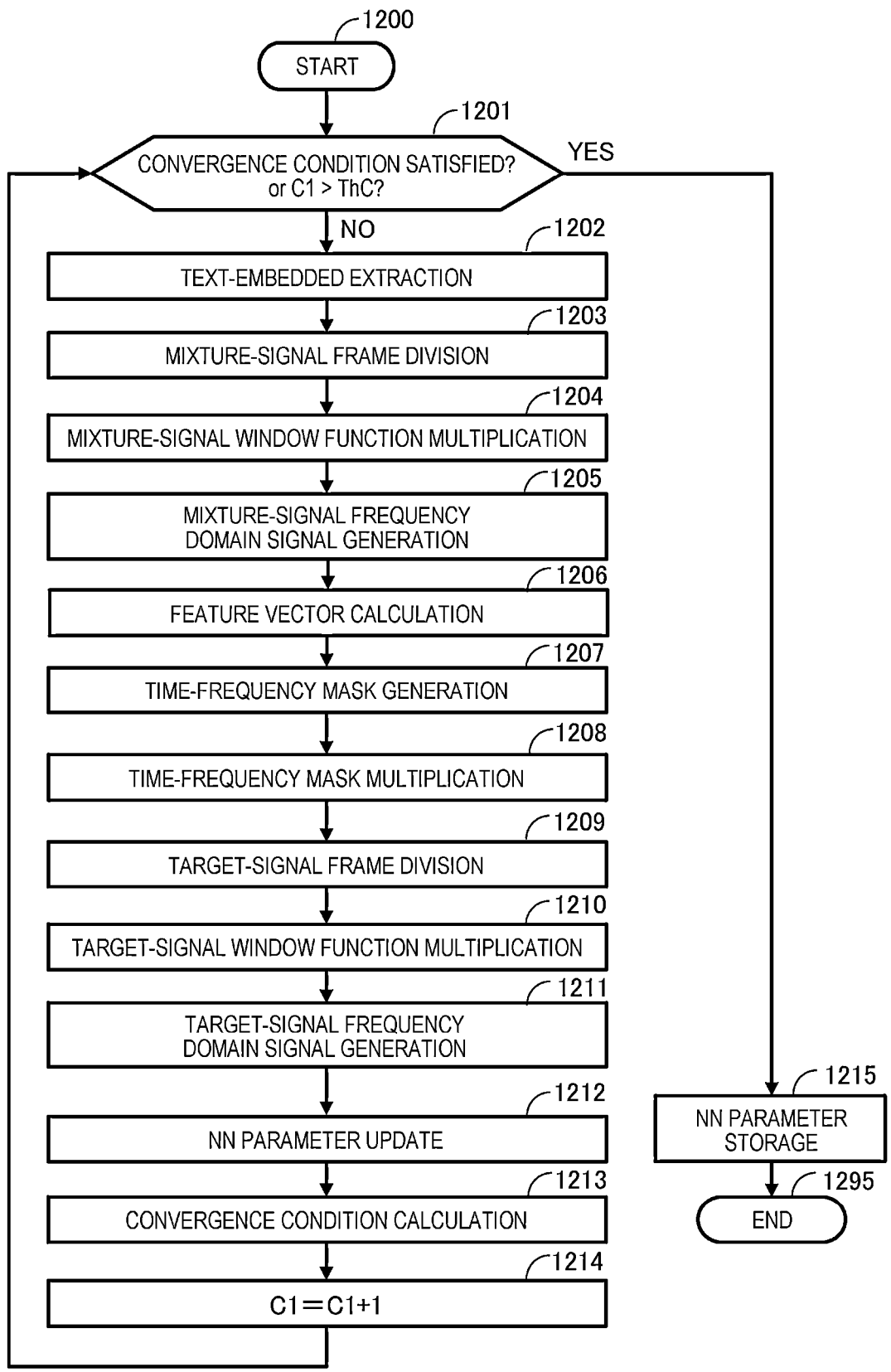
FIG. 12 is a flowchart showing an example of a processing flow of the learning subsystem.

A specific operation of the learning subsystem 110 will be described. FIG. 12 is an example of a processing flow of the learning subsystem 110. The learning subsystem 110 executes the processing flow of FIG. 12. When the learning subsystem 110 reads out, from the training data set database 160, a set of three items including the target-signal time waveform D10, the mixture-signal time waveform D20, and the variable-length descriptive text D1100, the learning subsystem 110 starts processing from step 1200 in FIG. 12, proceeds to step 1201, and determines whether the learning end condition is satisfied. The learning end condition is a condition which is satisfied when either a condition 1 or a condition 2 described below is satisfied. The condition 1 is satisfied when a predetermined convergence condition is satisfied (for example, when the convergence determination function is smaller than a predetermined threshold value). The condition 2 is satisfied when the counter C1 is larger than the threshold value ThC (C1>ThC). The learning end condition may be only the condition 2.

When the learning end condition is not satisfied, the learning subsystem 110 determines "NO" in step 1201, sequentially executes processing of steps 1202 to 1214 described below, and then returns to step 1201.

Step 1202: The learning subsystem 110 calculates (extracts), by the text-embedded extraction unit 119, the text-embedded vector D1101 from the variable-length descriptive text D1100 using a latest text-embedded extraction model.

Step 1203: The learning subsystem 110 performs, by the mixture-signal frame division processing unit 114, frame division of the mixture-signal time waveform, and calculates (outputs) a mixture-signal frame division signal.

Step 1204: The learning subsystem 110 performs, by the mixture-signal window function multiplication unit 115, window function multiplication, and converts the mixture-signal frame division signal into a mixture-signal window function multiplication signal.

Step 1205: The learning subsystem 110 converts, by the mixture-signal frequency domain signal generation unit 116, the mixture-signal window function multiplication signal into the mixture-signal time-frequency domain representation D21.

Step 1206: The learning subsystem 110 calculates, by the feature extraction unit 117, the sound feature vector D22 from the mixture-signal time-frequency domain representation D21. In the present example, the learning subsystem 110 calculates, by the feature extraction unit 117, the sound feature vector D22 from the mixture-signal time-frequency domain representation D21 using a latest feature extraction model.

Step 1207: The learning subsystem 110 generates, by the time-frequency mask generation unit 119a, a time-frequency mask from the sound feature vector D22 and the text-embedded vector D1101 using a latest time-frequency mask generation model.

Step 1208: The learning subsystem 110 multiplies, by the time-frequency mask multiplication unit 119b, the mixture-signal time-frequency domain representation D21 by the time-frequency mask to generate the extraction-signal time-frequency domain representation D41.

Step 1209: The learning subsystem 110 performs, by the target-signal frame division processing unit 111, frame division of the target-signal time waveform D10, and calculates (outputs) a target-signal frame division signal.

Step 1210: The learning subsystem 110 performs, by the target-signal window function multiplication unit 112, window function multiplication, and converts the target-signal frame division signal into a target-signal window function multiplication signal.

Step 1211: The learning subsystem 110 performs, by the target-signal frequency domain signal generation unit 113, short-time Fourier transform, and converts the target-signal window function multiplication signal into the target-signal time-frequency domain representation D11.

Step 1212: The learning subsystem 110 minimizes, by the learning unit 119c, a value of a loss function defined by a distance between the extraction-signal time-frequency domain representation D41 and the target-signal time-frequency domain representation D11 to learn (update) parameters of the feature extraction model, the text-embedded extraction model, and the time-frequency mask generation model (parameters of the neural networks (NNs)).

Step 1213: The learning subsystem 110 calculates a convergence condition indicating whether convergence occurs. The convergence condition is defined by, for example, a magnitude of a change from a previous iteration (training) of the loss function. Alternatively, the convergence condition is defined by a magnitude of a change from the previous iteration (training) of the parameters of the feature extraction model, the text-embedded extraction model, and the time-frequency mask generation model. When the change is sufficiently small, it is determined that convergence occurs (step 1201).

Step 1214: The learning subsystem 110 increases a current value of the counter C1 by "1".

When the learning end condition is satisfied in step 1201, the learning subsystem 110 determines "YES" in step 1201 and proceeds to step 1215 to store the feature extraction model, the text-embedded extraction model, and the time-frequency mask generation model (parameters of the neural networks (NNs)) in the respective databases. Thereafter, the learning subsystem 110 proceeds to step 1295 and temporarily ends the processing flow.

<Sound Extraction Subsystem>

(Function of Sound Extraction Subsystem)

Figure 13:
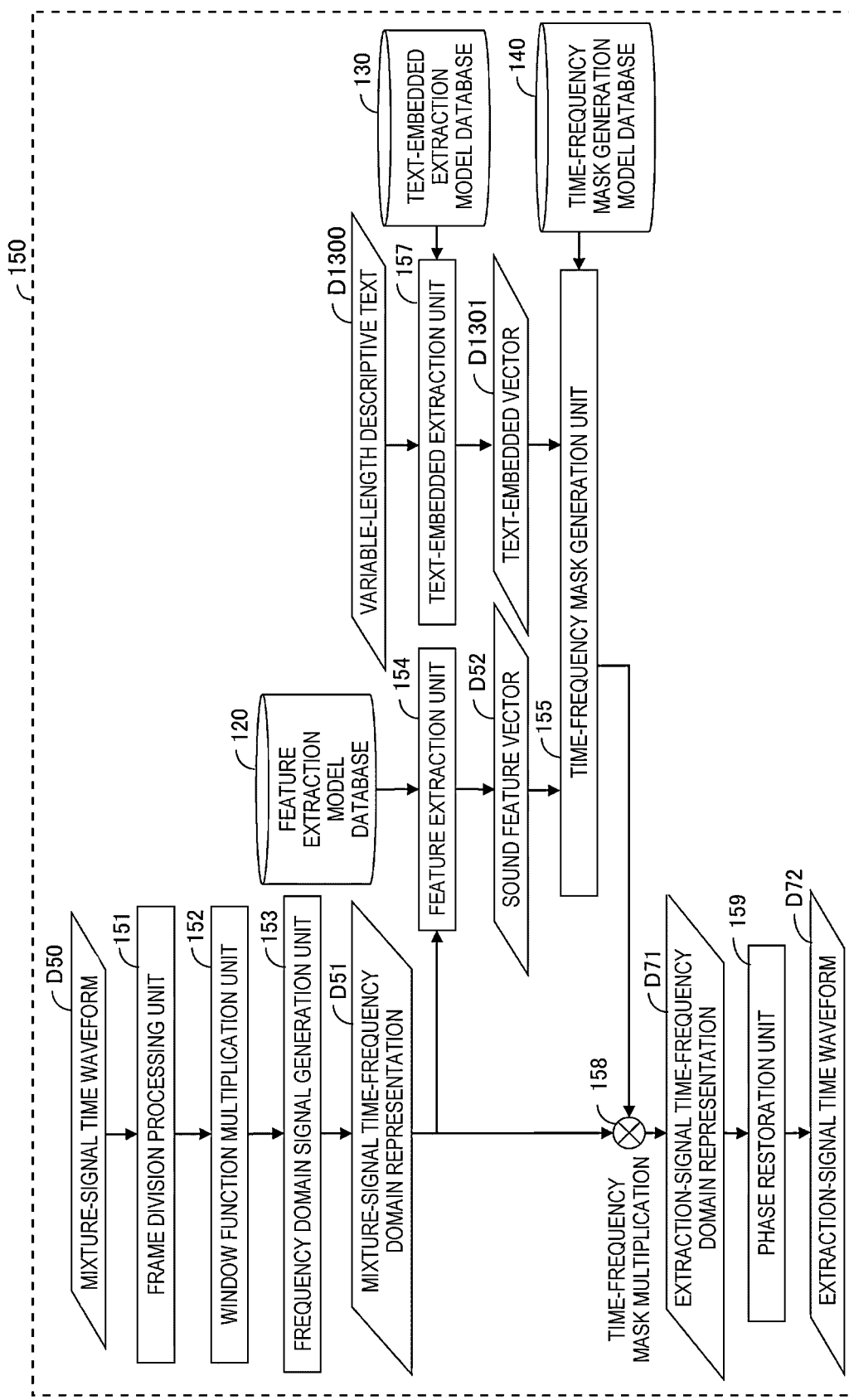
FIG. 13 is a block diagram showing a configuration example of the sound extraction subsystem for each function.

Hereinafter, a configuration of the sound extraction subsystem 150 will be described mainly for each function. FIG. 13 is a block diagram showing a configuration example of the sound extraction subsystem 150 for each function.

As shown in FIG. 13, the sound extraction subsystem 150 includes the mixture-signal frame division processing unit 151, the mixture-signal window function multiplication unit 152, the mixture-signal frequency domain signal generation unit 153, the feature extraction unit 154, the time-frequency mask generation unit 155, the text-embedded extraction unit 157, the time-frequency mask multiplication unit 158, and the phase restoration unit 159.

(Outline of Operation)

As shown in FIG. 13, the mixture-signal time waveform D50 is sequentially input to the mixture-signal frame division processing unit 151, the mixture-signal window function multiplication unit 152, and the mixture-signal frequency domain signal generation unit 153, and is converted into the mixture-signal time-frequency domain representation D51. The mixture-signal time-frequency domain representation D51 is input to the feature extraction unit 154, and is converted into the sound feature vector D52.

A variable-length descriptive text D1300 is input to the text-embedded extraction unit 157, and is converted into an embedded vector D1301 of the descriptive text D1300 (text-embedded vector D1301). The sound feature vector D52 and the text-embedded vector D1301 are input to the time-frequency mask generation unit 155 to generate a time-frequency mask.

The mixture-signal time-frequency domain representation D51 and the time-frequency mask are multiplied in the time-frequency mask multiplication unit 158 to generate the extraction-signal time-frequency domain representation D71. The extraction-signal time-frequency domain representation D71 is input to the phase restoration unit 159 to generate the extraction-signal time waveform D72.

(Specific Operation)

Figure 14:
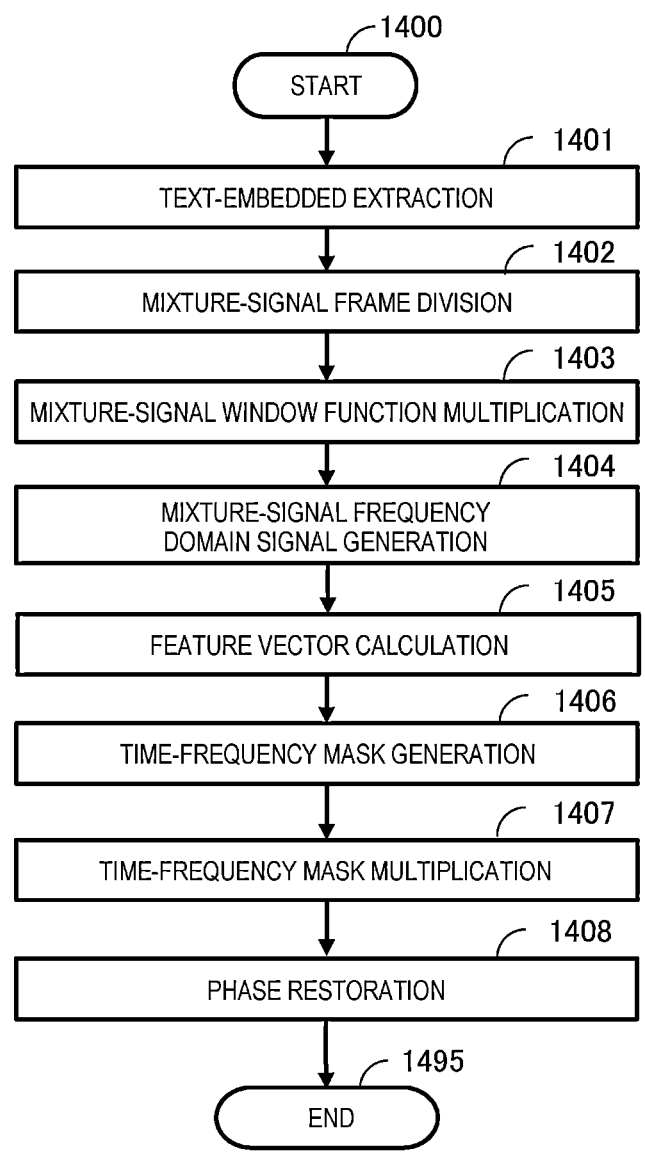
FIG. 14 is a flowchart showing an example of a processing flow of the sound extraction subsystem.

FIG. 14 is an example of a processing flow of the sound extraction subsystem 150. The sound extraction subsystem 150 executes the processing flow of FIG. 14. When the mixture-signal time waveform D50 and the variable-length descriptive text D1300 are input, the sound extraction subsystem 150 starts processing from step 1400 in FIG. 14, sequentially executes processing of steps 1401 to 1408 described below, and then proceeds to step 1495 and temporarily ends the processing flow.

Step 1401: The sound extraction subsystem 150 calculates (extracts), by the text-embedded extraction unit 157, the text-embedded vector D1301 from the variable-length descriptive text D1300 using a latest text-embedded extraction model.

Step 1402: The sound extraction subsystem 150 performs, by the mixture-signal frame division processing unit 151, frame division of the mixture-signal time waveform, and calculates (outputs) the mixture-signal frame division signal.

Step 1403: The sound extraction subsystem 150 performs, by the mixture-signal window function multiplication unit 152, window function multiplication, and converts the mixture-signal frame division signal into the mixture-signal window function multiplication signal.

Step 1404: The sound extraction subsystem 150 performs, by the mixture-signal frequency domain signal generation unit 153, short-time Fourier transform, and converts the mixture-signal window function multiplication signal into the mixture-signal time-frequency domain representation D51.

Step 1405: The sound extraction subsystem 150 calculates, by the feature extraction unit 154, the sound feature vector D52 from the mixture-signal time-frequency domain representation D51. In the present example, the sound extraction subsystem 150 calculates, by the feature extraction unit 154, the sound feature vector D52 from the mixture-signal time-frequency domain representation D51 using a latest feature extraction model.

Step 1406: The sound extraction subsystem 150 generates, by the time-frequency mask generation unit 155, the time-frequency mask from the sound feature vector D52 and the text-embedded vector D1301 using a latest time-frequency mask generation model.

Step 1407: The sound extraction subsystem 150 multiplies, by the time-frequency mask multiplication unit 158, the mixture-signal time-frequency domain representation D51 by the time-frequency mask to generate the extraction-signal time-frequency domain representation D71.

Step 1408: The sound extraction subsystem 150 generates, using the known Griffin-Lim algorithm or the like, the extraction-signal time waveform D72 from the extraction-signal time-frequency domain representation D71.

Effects

As described above, the sound extraction system 1000 according to the fourth embodiment of the invention can accurately extract (extract or emphasize), from mixture signals, a signal corresponding to a sound which the user wants to extract. With such a basic configuration, even when a range of the sound which the user wants to extract cannot be defined in advance as a certain type of event, the sound extraction system 1000 according to the fourth embodiment can extract the sound. The descriptive text is relatively generic and can be used across the application site.

Fifth Embodiment

Figure 15:
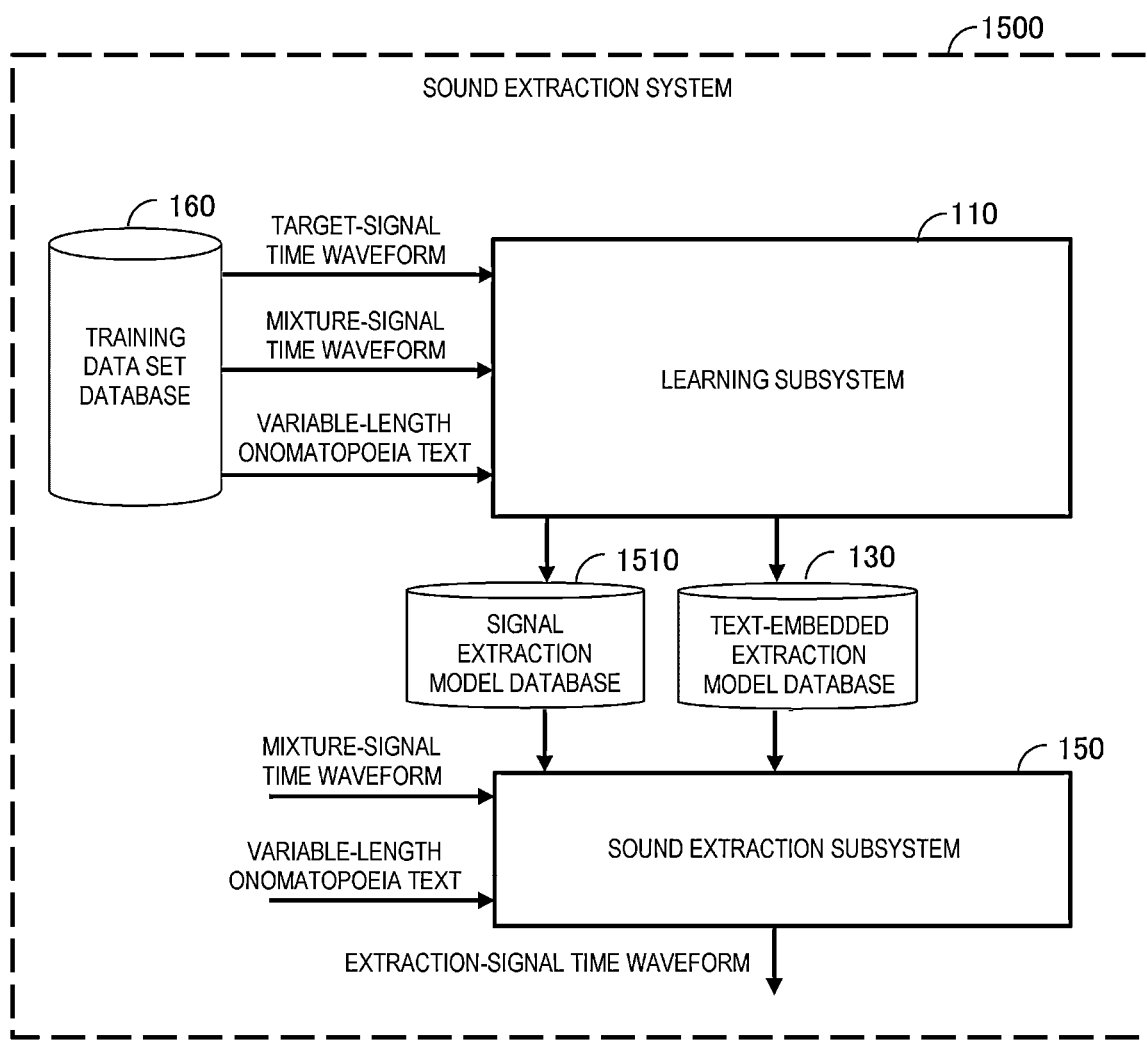
FIG. 15 is a block configuration diagram showing a schematic configuration example of a sound extraction system according to a fifth embodiment of the invention.

A sound extraction system 1500 according to a fifth embodiment of the invention will be described. FIG. 15 is a block configuration diagram showing a schematic configuration example of the sound extraction system 1500 according to the fifth embodiment of the invention. As shown in FIG. 15, the sound extraction system 1500 includes the learning subsystem 110, a signal extraction model database 1510, the text-embedded extraction model database 130, the sound extraction subsystem 150, and the training data set database 160. Differences from the first embodiment shown in FIG. 1 will be described. The learning subsystem 110 executes learning processing, outputs a signal extraction model and a text-embedded extraction model, and stores the signal extraction model and the text-embedded extraction model in respective databases. That is, the learning subsystem 110 stores the signal extraction model in the signal extraction model database 1510, and stores the text-embedded extraction model in the text-embedded extraction model database 130.

The sound extraction subsystem 150 reads out the signal extraction model and the text-embedded extraction model from the databases (the signal extraction model database 1510 and the text-embedded extraction model database 130), and executes sound extraction processing based on (using) the read models. Accordingly, the sound extraction subsystem 150 extracts an extraction-signal time waveform from the mixture-signal time waveform and the variable-length onomatopoeia text. Further, the sound extraction subsystem 150 outputs the extraction-signal time waveform.

<Learning Subsystem>
(Function of Learning Subsystem)

Figure 16:
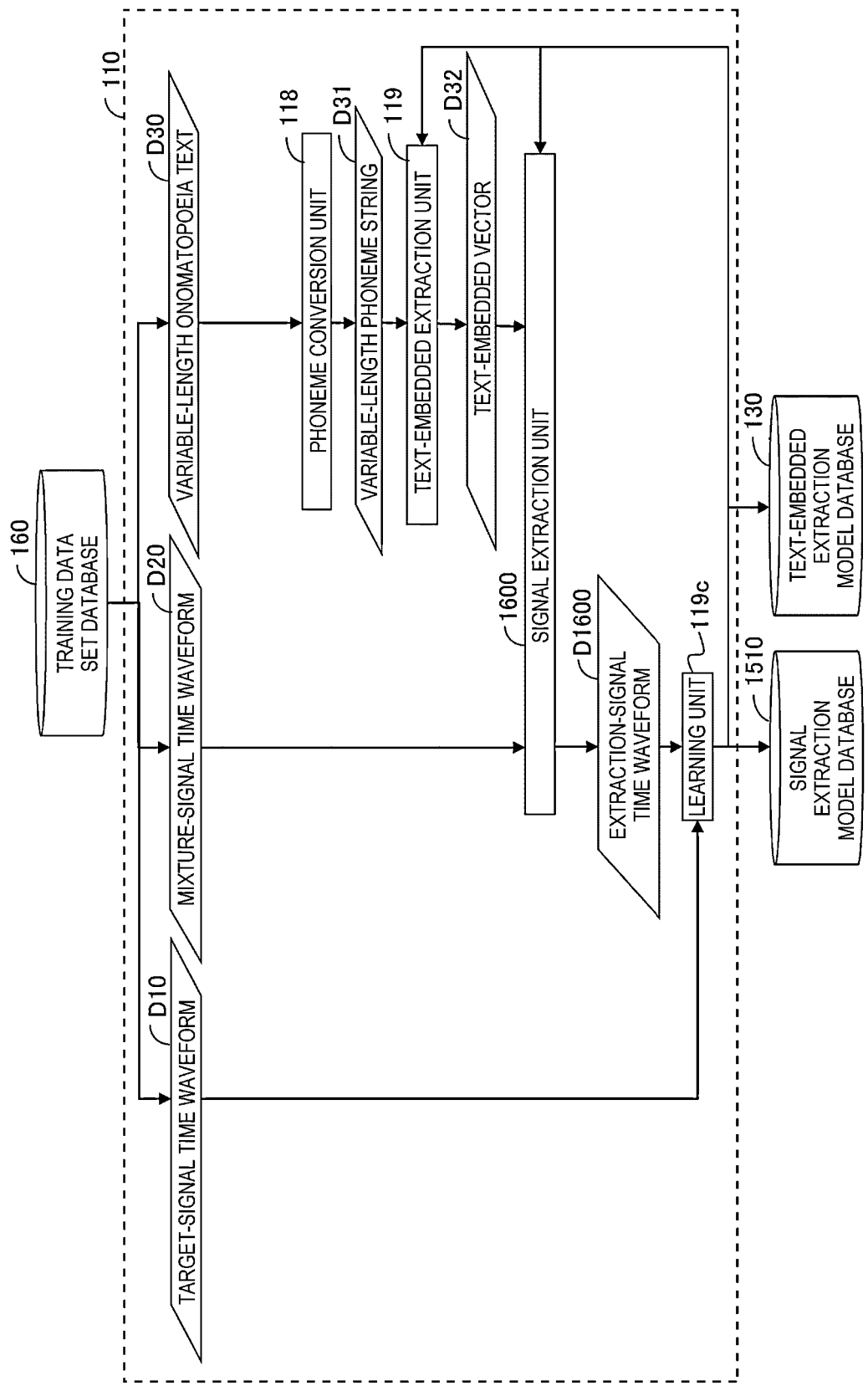
FIG. 16 is a block diagram showing a configuration example of the learning subsystem for each function.

Hereinafter, a configuration of the learning subsystem 110 will be described mainly for each function. FIG. 16 is a block diagram showing a configuration example of the learning subsystem 110 for each function. As shown in FIG. 16, the learning subsystem 110 includes the phoneme conversion unit 118, the text-embedded extraction unit 119, a signal extraction unit 1600, and the learning unit 119c. The phoneme conversion unit 118, the text-embedded extraction unit 119, the signal extraction unit 1600, and the learning unit 119c are implemented by various programs (not shown) stored in the ROM 202 and/or the storage device 204 of the information processing device 200.

The signal extraction unit 1600 generates, using a latest signal extraction model, an extraction-signal time waveform D1600 from the mixture-signal time waveform D20 and the text-embedded vector D32.

The signal extraction model is a neural network which receives the mixture-signal time waveform D20 and the text-embedded vector D32 and outputs the extraction-signal time waveform D1600. The signal extraction model may be, for example, a neural network including only fully connected layers, or may be a neural network in which a plurality of convolution layers, activation functions, and pooling layers are stacked with a self-attention layer or a skip connection interposed thereamong. When a time-frequency mask is used as in the first embodiment, a time-frequency representation is required. However, the time-frequency representation is not necessarily appropriate in terms of extraction accuracy. On the other hand, for the signal extraction model here, the time waveform is directly inputted to the neural network, so that there is an advantage that a representation with high extraction accuracy can be obtained if a training data set is sufficiently large.

In the case of the neural network including only fully connected layers, there is an advantage that the extraction accuracy is high when a scale of the training data set is large, and in the case of the neural network in which a plurality of convolution layers, activation functions, and pooling layers are stacked with a self-attention layer or a skip connection interposed thereamong, there is an advantage that the extraction accuracy is high even when the training data set is small.

The signal extraction model, as well-known Conv-TasNet, may be a model including: an encoder which receives the mixture-signal time waveform D20 and outputs a feature vector time series; a time feature mask generation neural network which receives the feature vector time series and the embedded vector D32 and calculates a two-dimensional mask (time feature mask) on a time axis and a feature axis; a multiplication mechanism which multiplies the time feature mask by the feature vector time series and calculates an extracted feature vector time series; and a decoder which receives the extracted feature vector time series and generates the extraction-signal time waveform D1600. Each of the encoder and the decoder is, for example, a neural network including a one-dimensional convolution layer. The time feature mask generation neural network may be a neural network including only fully connected layers, or may be a neural network in which a plurality of convolution layers, activation functions, and pooling layers are stacked with a self-attention layer or a skip connection interposed thereamong. When the time-frequency mask is used as in the first embodiment, the time-frequency representation is required, but high extraction accuracy cannot be necessarily expected when the time-frequency representation is used. On the other hand, in the signal extraction model which performs conversion into a time feature inside the neural network, since a time feature representation trained to increase the extraction accuracy is used, there is an advantage that the extraction accuracy is higher than that when the time-frequency representation is used.

The learning unit 119c minimizes a value of a loss function defined by a distance between the extraction-signal time waveform D1600 and the target-signal time waveform D10 to learn parameters of the signal extraction model and the text-embedded extraction model.

The learning unit 119c further calculates a convergence determination function used for determining whether convergence occurs. For example, the convergence determination function is defined by a magnitude of a change in the value of the loss function from a previous iteration (training). The convergence determination function may be defined by a magnitude of a change from a previous iteration (training) of a parameter of the signal extraction model, a magnitude of a change from a previous iteration (training) of a parameter of the text-embedded extraction model, or a product of these magnitudes of the changes. If the change is sufficiently small, it is determined that convergence occurs. For example, if the convergence determination function is smaller than a predetermined threshold value, it is determined that convergence occurs.

(Outline of Operation)

An outline of an operation of the learning subsystem 110 will be described. The learning subsystem 110 reads out, from the training data set database 160, a set of three items including "the target-signal time waveform D10, the mixture-signal time waveform D20 obtained by mixing the target-signal time waveform and a signal corresponding to noise other than the target signal, and the variable-length onomatopoeia text D30".

The variable-length onomatopoeia text D30 is input to the phoneme conversion unit 118, and is converted into the variable-length phoneme string D31. The variable-length phoneme string D31 is input to the text-embedded extraction unit 119, and is converted into the text-embedded vector D32.

The mixture-signal time waveform D20 and the text-embedded vector D32 are input to the signal extraction unit 1600 to generate the extraction-signal time waveform D1600.

The target-signal time waveform D10 and the extraction-signal time waveform D1600 are input to the learning unit 119c. The learning unit 119c learns parameters of the signal extraction model and the text-embedded extraction model, and updates the parameters. The signal extraction model and the text-embedded extraction model in which the parameters are updated are stored in the signal extraction model database 1510 and the text-embedded extraction model database 130, respectively. The signal extraction model and the text-embedded extraction model in which the parameters are updated are also referred to as "trained models" for convenience.

(Specific Operation)

Figure 17:
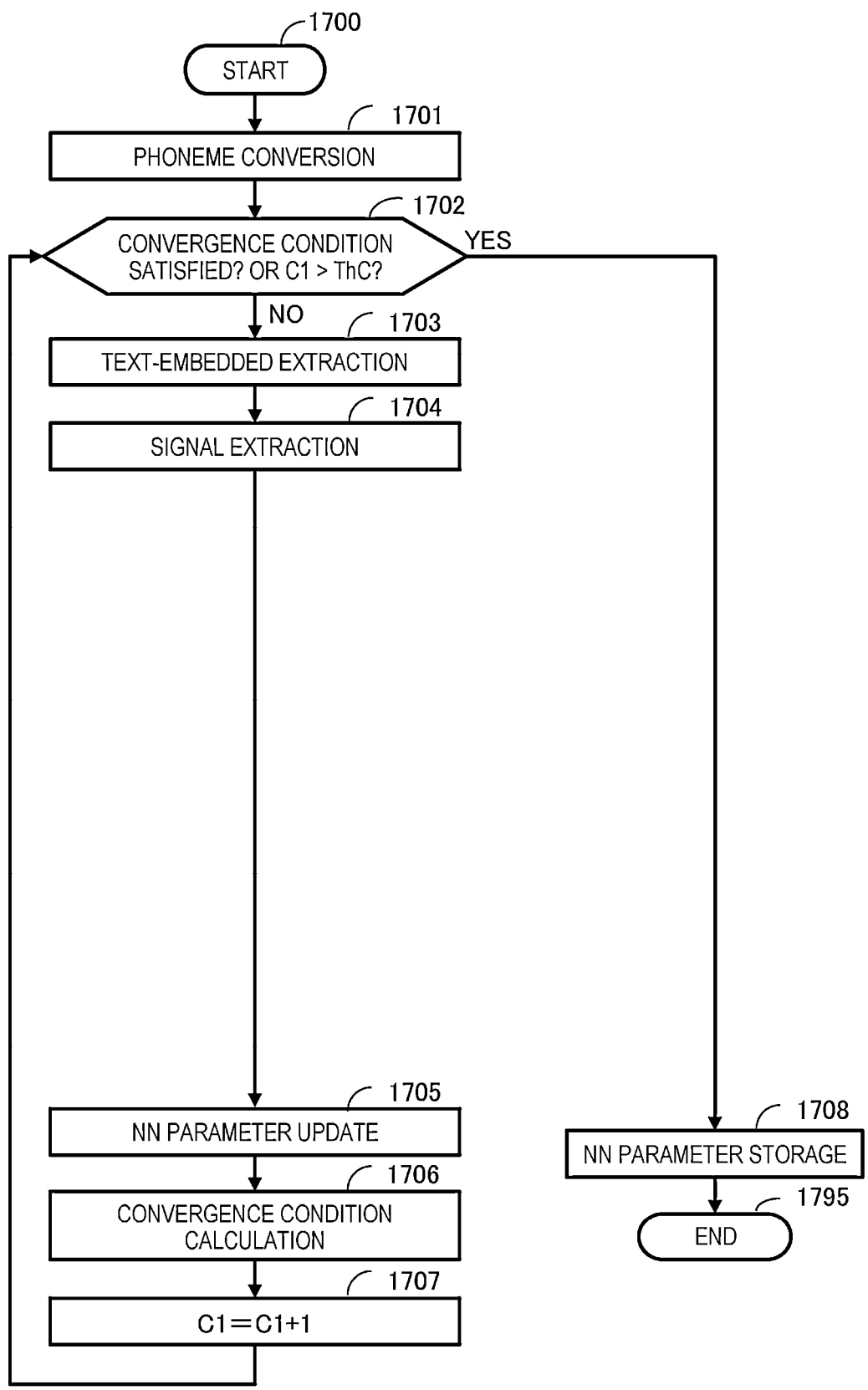
FIG. 17 is a flowchart showing an example of a processing flow of the learning subsystem.

A specific operation of the learning subsystem 110 will be described. FIG. 17 is an example of a processing flow of the learning subsystem 110. The learning subsystem 110 executes the processing flow of FIG. 17. When the learning subsystem 110 reads out, from the training data set database 160, a set of three items including the target-signal time waveform D10, the mixture-signal time waveform D20, and the variable-length onomatopoeia text D30, the learning subsystem 110 starts processing from step 1700 in FIG. 17 and proceeds to step 1701. When the learning subsystem 110 proceeds to step 1701, the learning subsystem 110 calculates, by the phoneme conversion unit 118, the variable-length phoneme string D31 from the variable-length onomatopoeia text D30 by phoneme conversion processing (converts the onomatopoeia text D30 into the phoneme string D31).

Thereafter, the learning subsystem 110 proceeds to step 1702, and determines whether a learning end condition is satisfied. The learning end condition is a condition which is satisfied when either a condition 1 or a condition 2 described below is satisfied. The condition 1 is satisfied when a predetermined convergence condition is satisfied (for example, when the convergence determination function is smaller than a predetermined threshold value). The condition 2 is satisfied when the counter C1 is larger than the threshold value ThC (C1>ThC). The learning end condition may be only the condition 2.

When the learning end condition is not satisfied, the learning subsystem 110 determines "NO" in step 1702, sequentially executes processing of steps 1703 to 1707 described below, and then returns to step 1702.

Step 1703: The learning subsystem 110 calculates (extracts), by the text-embedded extraction unit 119, the text-embedded vector D32 from the phoneme string D31 using a latest text-embedded extraction model.

Step 1704: The learning subsystem 110 generates, by the signal extraction unit 1600, the extraction-signal time waveform D1600 from the mixture-signal time waveform D20 and the text-embedded vector D32 using a latest signal extraction model.

Step 1705: The learning subsystem 110 minimizes, by the learning unit 119c, a value of a loss function defined by a distance between the extraction-signal time waveform D1600 and the target-signal time waveform D10 to learn parameters of the signal extraction model and the text-embedded extraction model (parameters of the neural networks (NNs)) (that is, update each model).

Step 1706: The learning subsystem 110 calculates, by the learning unit 119c, a convergence condition indicating whether convergence occurs. The convergence condition is defined by, for example, a magnitude of a change from the previous iteration (training) of the loss function. Alternatively, the convergence condition is defined by a magnitude of a change from a previous iteration (training) of the parameters of the signal extraction model and the text-embedded extraction model. If the change is sufficiently small, it is determined that convergence occurs (step 1702).

Step 1707: The learning subsystem 110 increases a current value of the counter C1 by "1".

When the learning end condition is satisfied in step 1702, the learning subsystem 110 determines "YES" in step 1702 and proceeds to step 1708 to store the signal extraction model and the text-embedded extraction model (parameters of the neural networks (NNs)) in the respective databases (the signal extraction model database 1510 and the text-embedded extraction model database 130). Thereafter, the learning subsystem 110 proceeds to step 1795 and temporarily ends the processing flow.

<Sound Extraction Subsystem>
(Function of Sound Extraction Subsystem)

Figure 18:
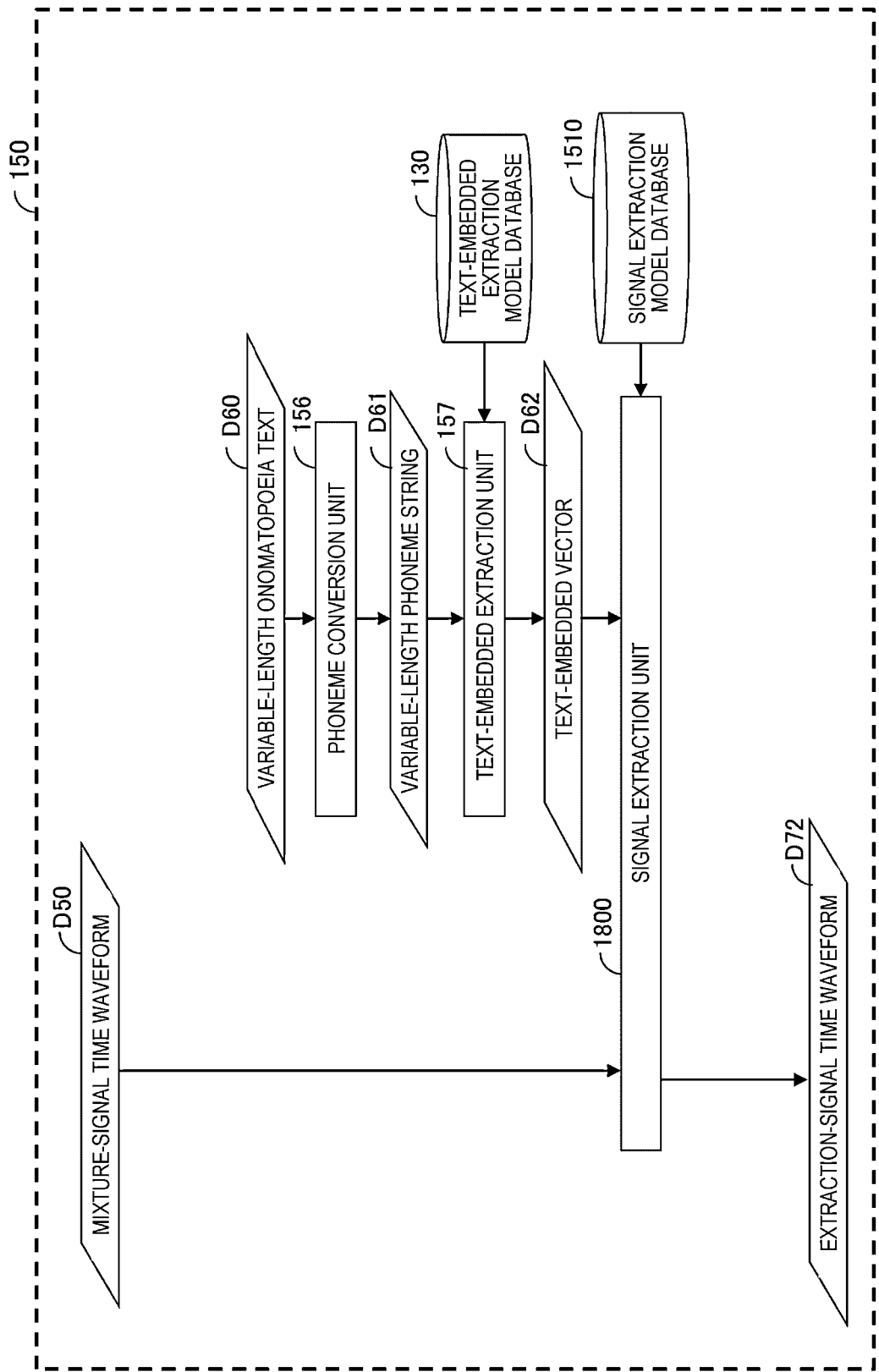
FIG. 18 is a block diagram showing a configuration example of the sound extraction subsystem for each function.

A configuration of the sound extraction subsystem 150 will be described mainly for each function. FIG. 18 is a block diagram showing a configuration example of the sound extraction subsystem 150 for each function.

As shown in FIG. 18, the sound extraction subsystem 150 includes the phoneme conversion unit 156, the text-embedded extraction unit 157, and a signal extraction unit 1800. The phoneme conversion unit 156, the text-embedded extraction unit 157, and the signal extraction unit 1800 are implemented by various programs (not shown) stored in the ROM 202 and/or the storage device 204 of the information processing device 200.

The phoneme conversion unit 156 outputs the variable-length phoneme string D61 from the variable-length onomatopoeia text D60 by phoneme conversion processing (converts the onomatopoeia text D60 into the phoneme string D61).

The text-embedded extraction unit 157 calculates (extracts), using a latest text-embedded extraction model, the text-embedded vector D62 from the phoneme string D61.

The signal extraction unit 1800 generates, using a latest signal extraction model, the extraction-signal time waveform D72 from the mixture-signal time waveform D50 and the text-embedded vector D62.

(Specific Operation)

Figure 19:
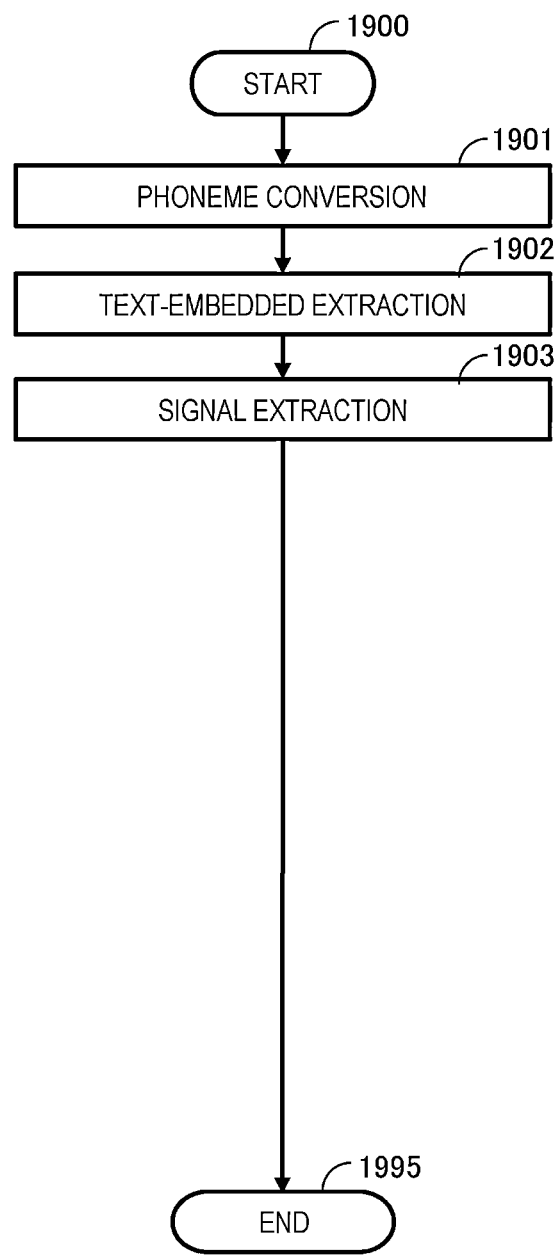
FIG. 19 is a flowchart showing an example of a processing flow of the sound extraction subsystem.

A specific operation of the sound extraction subsystem 150 will be described. FIG. 19 is an example of a processing flow of the sound extraction subsystem 150. The sound extraction subsystem 150 executes the processing flow of FIG. 19. When the mixture-signal time waveform D50 and the variable-length onomatopoeia text D60 are input, the sound extraction subsystem 150 starts processing from step 1900 in FIG. 19, sequentially executes processing of steps 1901 to 1903 described below, and then proceeds to step 1995 and temporarily ends the processing flow.

Step 1901: The sound extraction subsystem 150 outputs, by the phoneme conversion unit 156, the variable-length phoneme string D61 from the variable-length onomatopoeia text D60 by phoneme conversion processing (converts the onomatopoeia text D60 into the phoneme string D61).

Step 1902: The sound extraction subsystem 150 calculates (extracts), by the text-embedded extraction unit 157, the text-embedded vector D62 from the phoneme string D61 using a latest text-embedded extraction model.

Step 1903: The sound extraction subsystem 150 generates, by the signal extraction unit 1800, the extraction-signal time waveform D72 from the mixture-signal time waveform D50 and the text-embedded vector D62 using a latest signal extraction model.

Effects

As described above, the sound extraction system 1500 according to the fifth embodiment of the invention can accurately extract (extract or emphasize), from mixture signals, a signal corresponding to a sound which the user wants to extract. Further, the sound extraction system 1500 according to the fifth embodiment can provide an infinite number of text, and can designate an infinite range of the sound. Therefore, the sound extraction system 1500 according to the fifth embodiment can accurately extract, from mixture signals, a signal corresponding to a sound which the user wants to extract by providing text corresponding to the sound which the user wants to extract even when the range of the sound which the user wants to extract cannot be defined in advance as a certain type of event. Further, unlike the first embodiment, in the sound extraction system 1500 according to the fifth embodiment, the mixture-signal time waveform D50 is directly inputted to the neural network without being converted into the time-frequency representation, and thus a reduction in the extraction accuracy due to use of the time-frequency representation can be avoided. Since the sound extraction system 1500 according to the fifth embodiment generates the extraction-signal time waveform D72 without performing the phase restoration processing, there is also an advantage that distortion due to the phase restoration processing does not occur.

Sixth Embodiment

Figure 20:
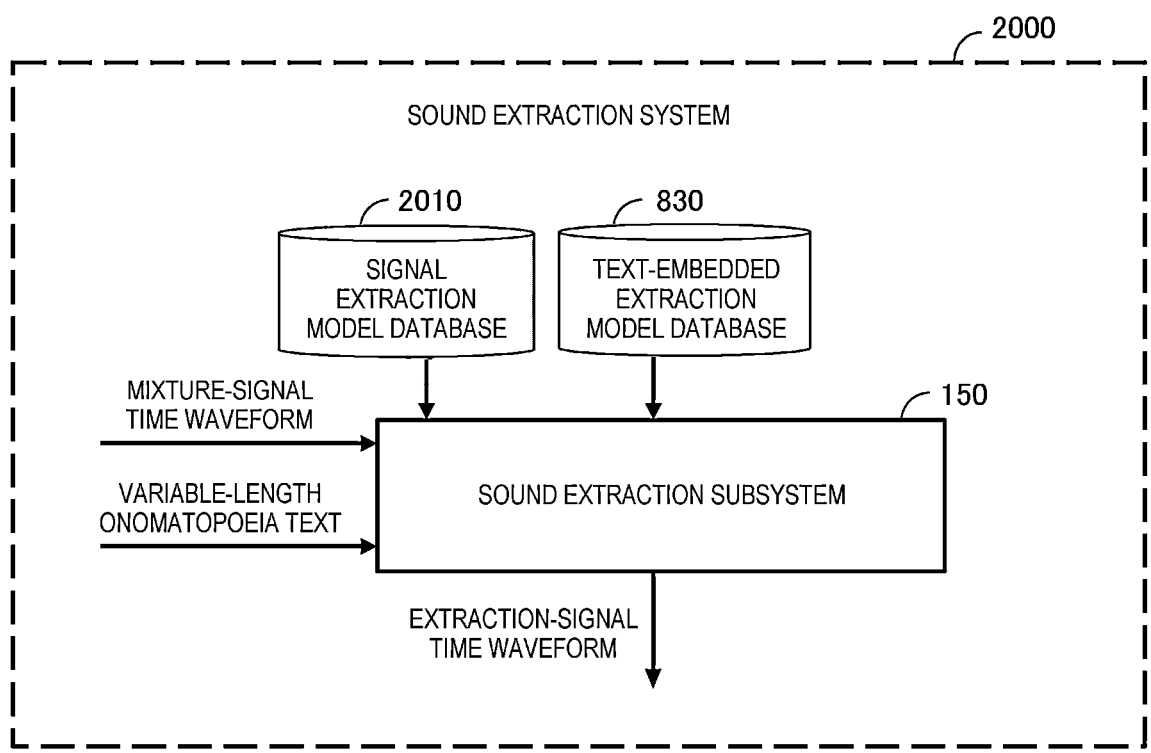
FIG. 20 is a block configuration diagram showing a schematic configuration example of a sound extraction system according to a sixth embodiment of the invention.

A sound extraction system 2000 according to a sixth embodiment of the invention will be described. FIG. 20 is a block configuration diagram showing a schematic configuration example of the sound extraction system 2000 according to the sixth embodiment of the invention. As shown in FIG. 20, the sound extraction system 2000 is different from the sound extraction system 1500 according to the fifth embodiment only in the following points.

In the sound extraction system 2000, the learning subsystem 110 of the sound extraction system 1500 according to the fifth embodiment is omitted, and a signal extraction model database 2010 and the text-embedded extraction model database 830 are used in which a signal extraction model and a text-embedded extraction model trained in advance based on a general database of correspondence between an environmental sound and onomatopoeia are stored. This difference will be mainly described below.

As shown in FIG. 20, the sound extraction system 2000 includes the sound extraction subsystem 150, the signal extraction model database 2010, and the text-embedded extraction model database 830. When a mixture-signal time waveform and variable-length onomatopoeia text are input, the sound extraction subsystem 150 outputs an extraction-signal time waveform using an existing signal extraction model and text-embedded extraction model. Details of this processing are similar as those of the fifth embodiment except that the existing signal extraction model and text-embedded extraction model are used, and thus the description thereof will be omitted.

Effects

As described above, similarly to the fifth embodiment, the sound extraction system 2000 according to the sixth embodiment of the invention can accurately extract (extract or emphasize), from mixture signals, a signal corresponding to a sound which the user wants to extract. In the sound extraction system 2000 according to the sixth embodiment, the mixture-signal time waveform is directly inputted to the neural network without being converted into the time-frequency representation, and thus a reduction in the extraction accuracy due to the use of the time-frequency representation can be avoided. Since the sound extraction system 2000 according to the sixth embodiment generates the extraction-signal time waveform without performing the phase restoration processing, there is also an advantage that the distortion due to the phase restoration processing does not occur. Further, since the sound extraction system 2000 according to the sixth embodiment can use the signal extraction model and the text-embedded extraction model which are trained in advance based on the general database of the correspondence between the environmental sound and the onomatopoeia, new learning processing to be performed by the learning subsystem 110 as in the sound extraction system 1500 according to the fifth embodiment is not required. There is an advantage that it is not required to construct a new training data set for each site.

Seventh Embodiment

Figure 21:
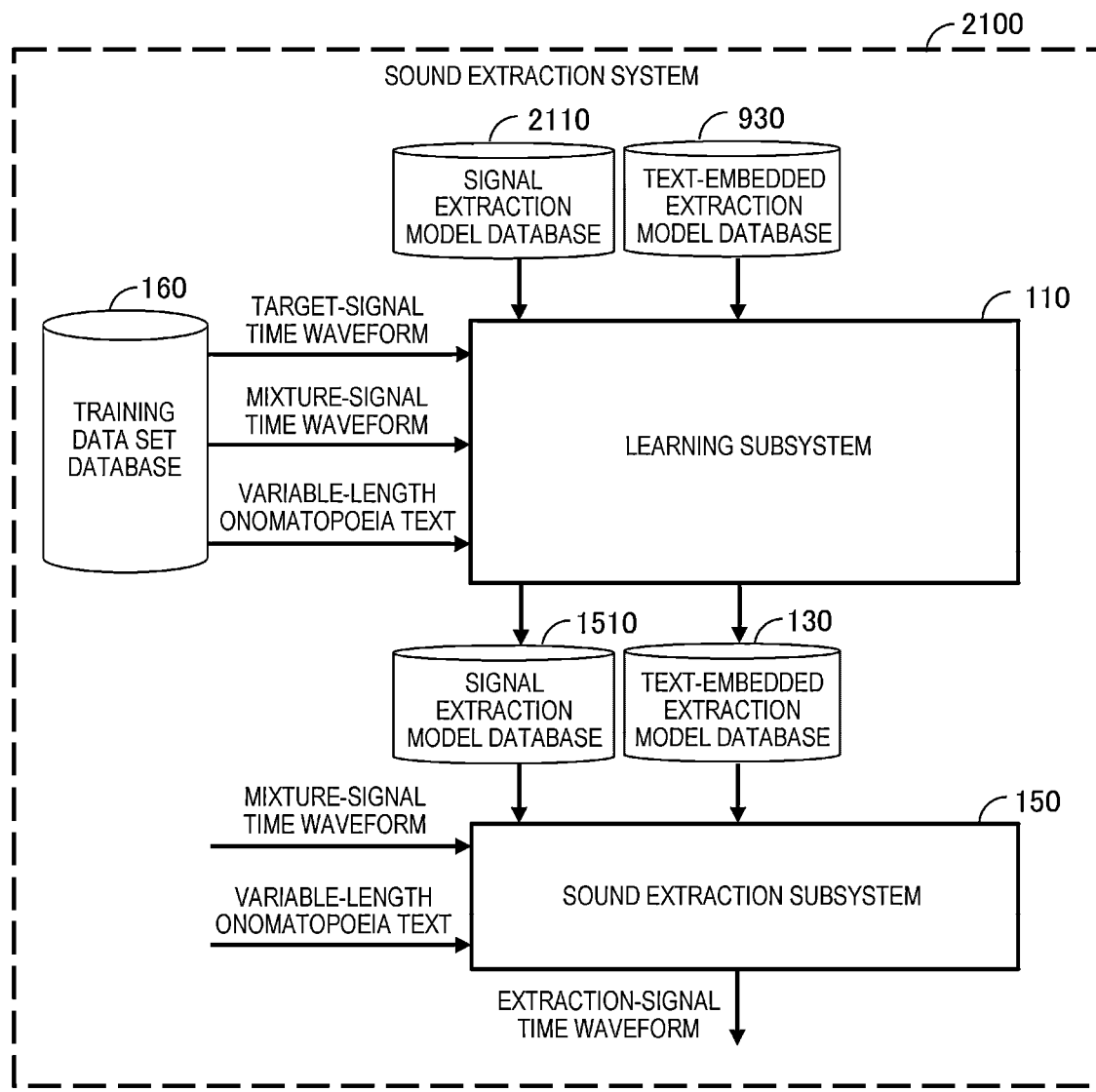
FIG. 21 is a block configuration diagram showing a schematic configuration example of a sound extraction system according to a seventh embodiment of the invention.

A sound extraction system 2100 according to a seventh embodiment of the invention will be described. FIG. 21 is a block configuration diagram showing a schematic configuration example of the sound extraction system 2100 according to the seventh embodiment of the invention. As shown in FIG. 21, in the sound extraction system 2100, the learning subsystem 110 uses a signal extraction model database 2110 and the text-embedded extraction model database 930 in which an existing signal extraction model and text-embedded extraction model trained in advance based on a general database of correspondence between an environmental sound and the onomatopoeia are stored. The learning subsystem 110 uses a training data set for each site to learn, thereby optimizing a model according to the site and improving accuracy. The sound extraction system 2100 according to the seventh embodiment is different from the sound extraction system 1500 according to the fifth embodiment only in the above points. Therefore, this difference will be mainly described below.

As shown in FIG. 21, the sound extraction system 2100 has a configuration in which the signal extraction model database 2110 and the text-embedded extraction model database 930 are added with respect to the sound extraction system 1500 according to the fifth embodiment. Existing models stored in the signal extraction model database 2110 and the text-embedded extraction model database 930 are also referred to as an "initial signal extraction model and initial text-embedded extraction model" for convenience, and are also referred to as "initial trained models".

The learning subsystem 110 uses the training data set for each site to learn, thereby optimizing (updating) the models (the existing signal extraction model and text-embedded extraction model) according to the site, and storing the optimized models in the signal extraction model database 1510 and the text-embedded extraction model database 130, respectively.

When a mixture-signal time waveform and variable-length onomatopoeia text are input, the sound extraction subsystem 150 outputs an extraction-signal time waveform by optimizing the existing signal extraction model and text-embedded extraction model. Details of this processing are similar as those of the fifth embodiment except that the signal extraction model and the text-embedded extraction model obtained by optimizing the existing model are used, and thus the description thereof will be omitted.

Effects

As described above, similarly to the fifth embodiment, the sound extraction system 2100 according to the seventh embodiment of the invention can accurately extract (extract or emphasize), from mixture signals, a signal corresponding to a sound which the user wants to extract. In the sound extraction system 2100 according to the seventh embodiment, the mixture-signal time waveform is directly inputted to the neural network without being converted into the time-frequency representation, and thus a reduction in the extraction accuracy due to the use of the time-frequency representation can be avoided. Since the sound extraction system 2100 according to the seventh embodiment generates the extraction-signal time waveform without performing the phase restoration processing, there is also an advantage that the distortion due to the phase restoration processing does not occur. Further, the sound extraction system 2100 according to the seventh embodiment has an advantage of using an existing model so that a small number of training data sets are newly constructed for each site while improving accuracy of the model according to the site.

Eighth Embodiment

Figure 22:
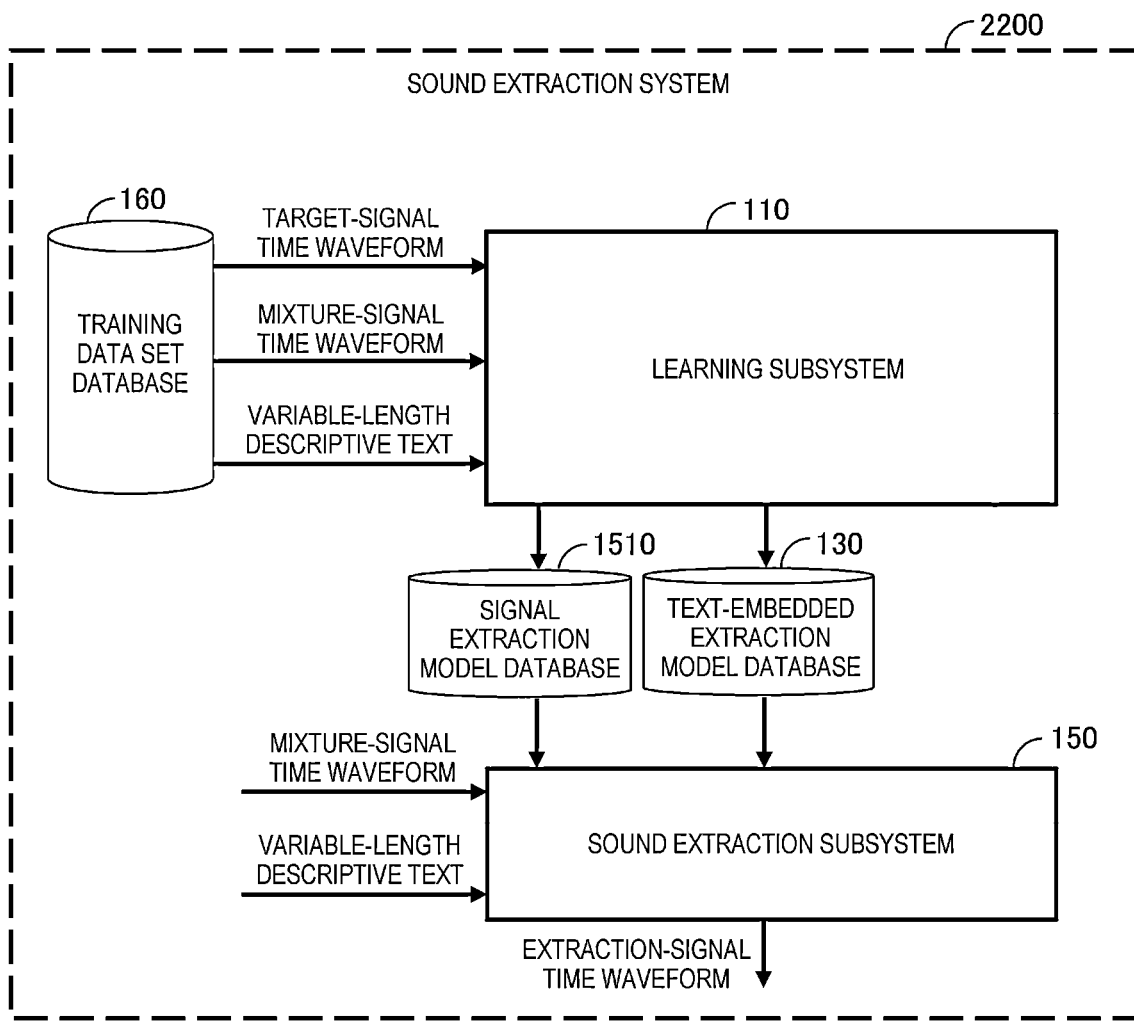
FIG. 22 is a block configuration diagram showing a schematic configuration example of a sound extraction system according to an eighth embodiment of the invention.

A sound extraction system 2200 according to an eighth embodiment of the invention will be described. FIG. 22 is a block configuration diagram showing a schematic configuration example of the sound extraction system 2200 according to the eighth embodiment of the invention. As shown in FIG. 22, the sound extraction system 2200 is different from the sound extraction system 1500 according to the fifth embodiment only in that text such as descriptive text (for example, "clang-clang followed by boom", or "impulsive sound followed by clang-clang") is used as text representing a range of a sound instead of the onomatopoeia. Therefore, this difference will be mainly described below.
<Learning Subsystem>
(Function of Learning Subsystem)

Figure 23:
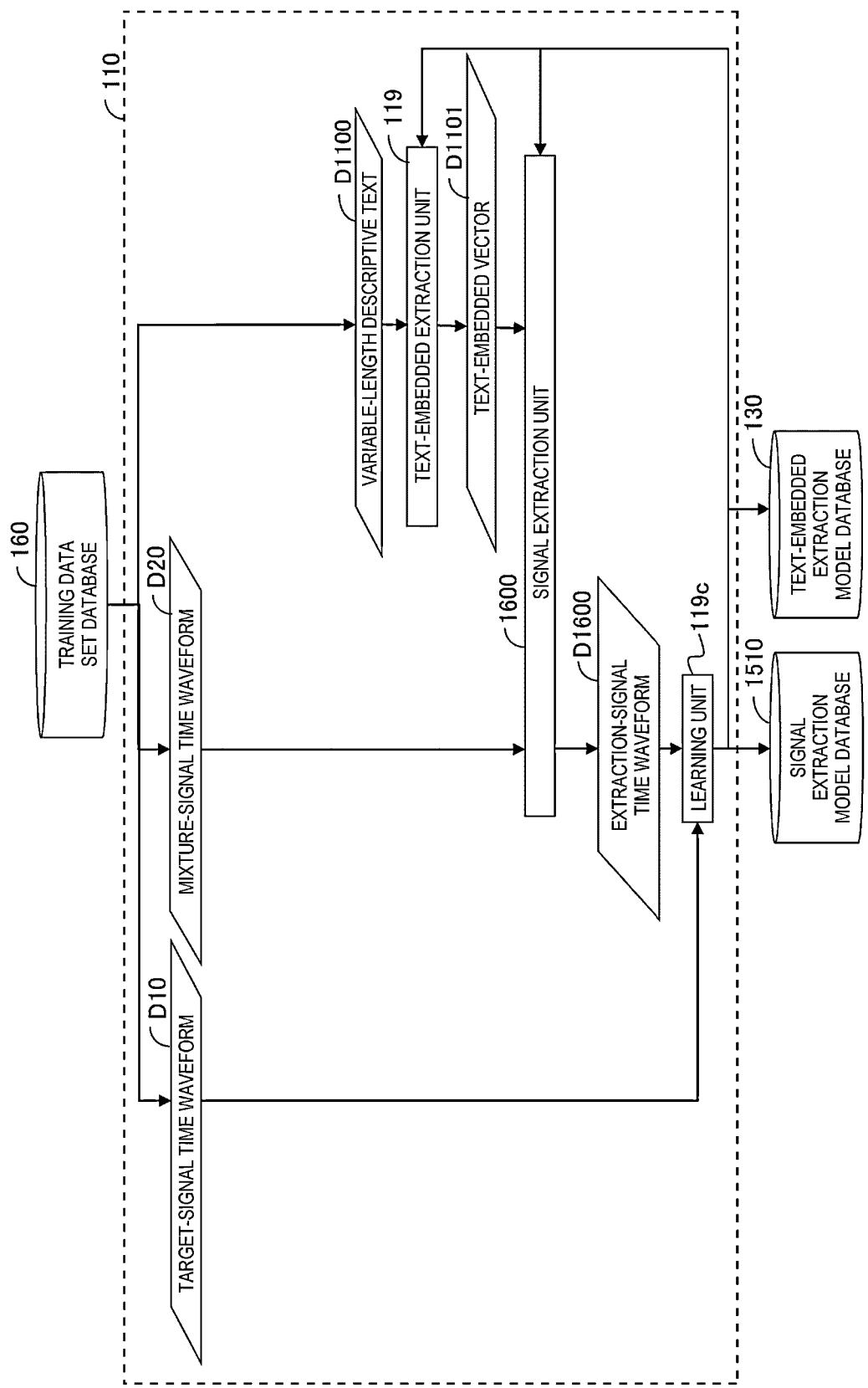
FIG. 23 is a block diagram showing a configuration example of the learning subsystem for each function.

FIG. 23 is a block diagram showing a configuration example of the learning subsystem 110 in the sound extraction system 2200 for each function. As shown in FIG. 23, the learning subsystem 110 includes the text-embedded extraction unit 119, the signal extraction unit 1600, and the learning unit 119c.
(Outline of Operation)

An outline of an operation of the learning subsystem 110 will be described. The learning subsystem 110 reads out, from the training data set database 160, a set of three items including "the target-signal (signal corresponding to an extraction target sound) time waveform D10, the mixture-signal time waveform D20 obtained by mixing the target-signal time waveform and a signal corresponding to noise other than the target signal (noise other than the extraction target sound), and a variable-length descriptive text D1100 (descriptive text corresponding to the extraction target sound)".

The variable-length descriptive text D1100 is input to the text-embedded extraction unit 119, and is converted into an embedded vector D1101 of the descriptive text D1100 (text-embedded vector D1101).

The mixture-signal time waveform D20 and the text-embedded vector D1101 are input to the signal extraction unit 1600 to generate the extraction-signal time waveform D1600.

When the target-signal time waveform D10 and the extraction-signal time waveform D1600 are input to the learning unit 119c, the learning unit 119c learns parameters of the signal extraction model and the text-embedded extraction model, and the parameters are updated.

The signal extraction model and the text-embedded extraction model in which the parameters are updated are stored in the signal extraction model database 1510 and the text-embedded extraction model database 130, respectively.
(Specific Operation)

Figure 24:
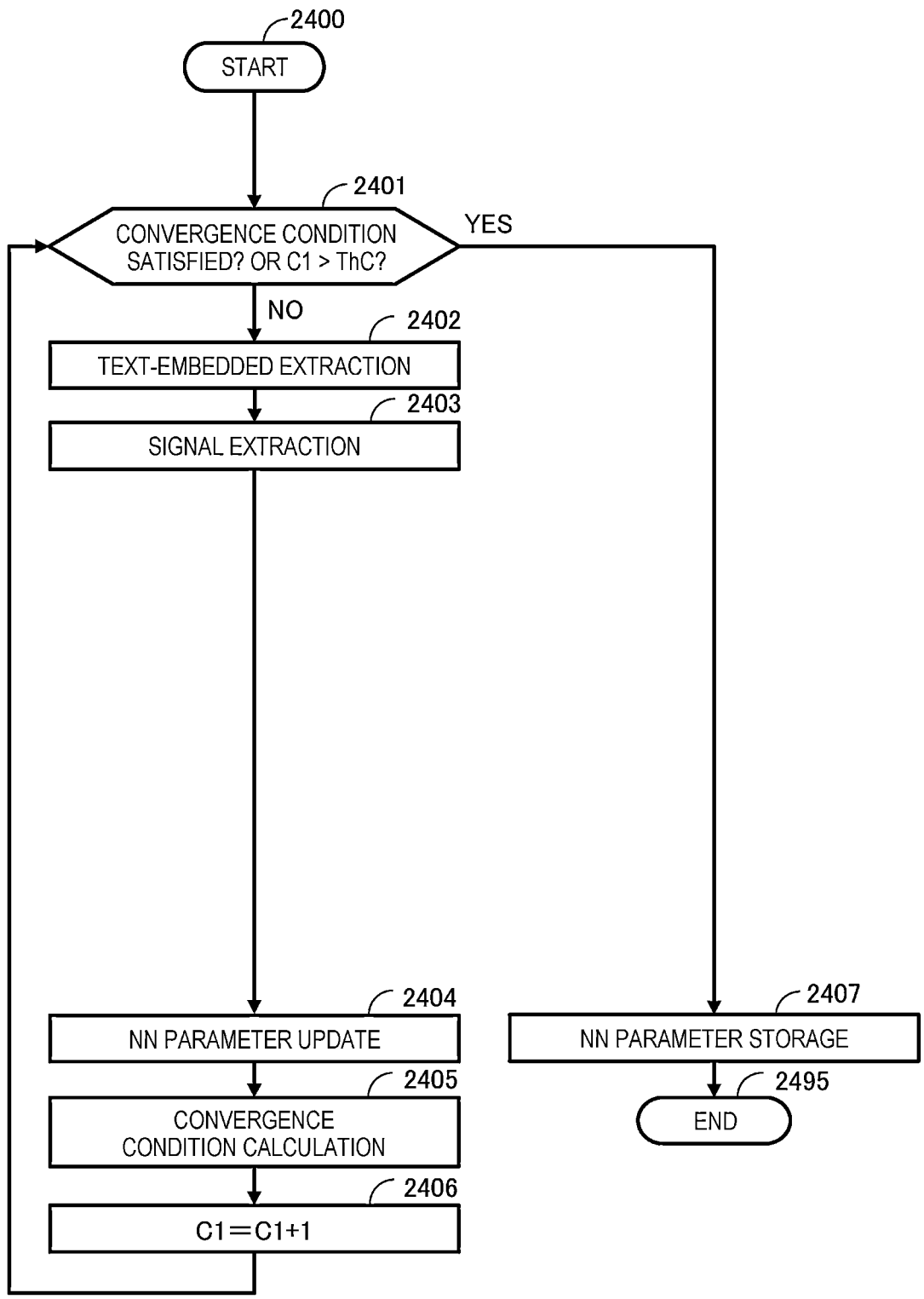
FIG. 24 is a flowchart showing an example of a processing flow of the learning subsystem.

A specific operation of the learning subsystem 110 will be described. FIG. 24 is an example of a processing flow of the learning subsystem 110. The learning subsystem 110 executes the processing flow of FIG. 24. When the learning subsystem 110 reads out, from the training data set database 160, a set of three items including the target-signal time waveform D10, the mixture-signal time waveform D20, and the variable-length descriptive text D1100, the learning subsystem 110 starts processing from step 2400 in FIG. 24, proceeds to step 2401, and determines whether the learning end condition is satisfied. The learning end condition is a condition which is satisfied when either a condition 1 or a condition 2 described below is satisfied. The condition 1 is satisfied when a predetermined convergence condition is satisfied (for example, when the convergence determination function is smaller than a predetermined threshold value). The condition 2 is satisfied when the counter C1 is larger than the threshold value ThC (C1>ThC). The learning end condition may be only the condition 2.

When the learning end condition is not satisfied, the learning subsystem 110 determines "NO" in step 2401, sequentially executes processing of steps 2402 to 2406 described below, and then returns to step 2401.

Step 2402: The learning subsystem 110 calculates (extracts), by the text-embedded extraction unit 119, the text-embedded vector D1101 from the variable-length descriptive text D1100 using a latest text-embedded extraction model.

Step 2403: The learning subsystem 110 generates, by the signal extraction unit 1600, the extraction-signal time waveform D1600 from the mixture-signal time waveform D20 and the text-embedded vector D1101 using a latest signal extraction model.

Step 2404: The learning subsystem 110 minimizes, by the learning unit 119c, a value of a loss function defined by a distance between the extraction-signal time waveform D1600 and the target-signal time waveform D10 to learn (update) parameters of the signal extraction model and the text-embedded extraction model (parameters of the neural networks (NNs)).

Step 2405: The learning subsystem 110 calculates a convergence condition indicating whether convergence occurs. The convergence condition is defined by, for example, a magnitude of a change from a previous iteration (training) of the loss function. Alternatively, the convergence condition is defined by a magnitude of a change from the previous iteration (training) of the parameters of the signal extraction model and the text-embedded extraction model. If the change is sufficiently small, it is determined that convergence occurs (step 2401).

Step 2406: The learning subsystem 110 increases a current value of the counter C1 by "1".

When the learning end condition is satisfied in step 2401, the learning subsystem 110 determines "YES" in step 2401 and proceeds to step 2407 to store the signal extraction model and the text-embedded extraction model (parameters of the neural networks (NNs)) in the respective databases. Thereafter, the learning subsystem 110 proceeds to step 2495 and temporarily ends the processing flow.
<Sound Extraction Subsystem>
(Function of Sound Extraction Subsystem)

Figure 25:
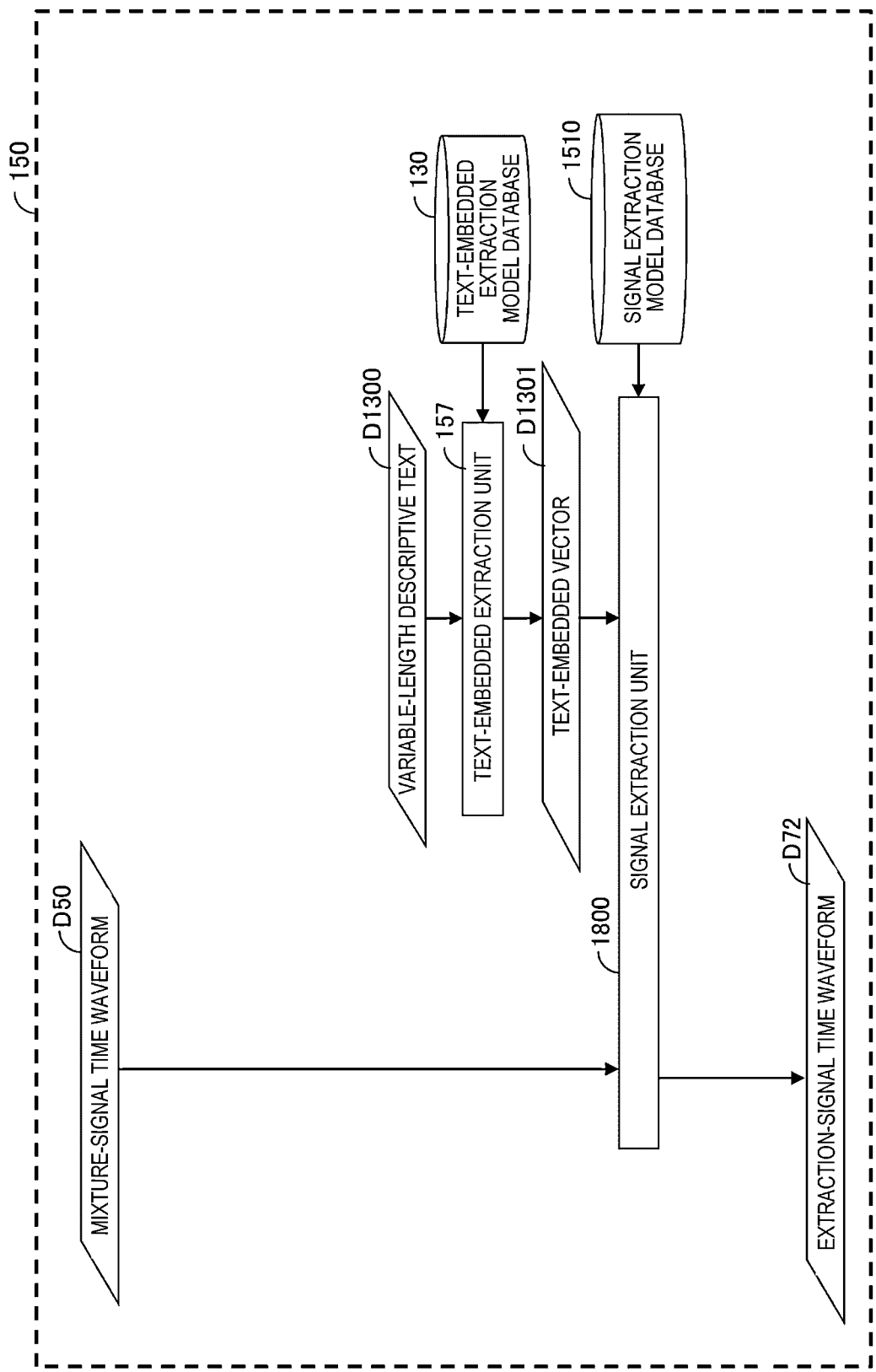
FIG. 25 is a block diagram showing a configuration example of the sound extraction subsystem for each function.

Hereinafter, a configuration of the sound extraction subsystem 150 will be described mainly for each function. FIG. 25 is a block diagram showing a configuration example of the sound extraction subsystem 150 for each function.

As shown in FIG. 25, the sound extraction subsystem 150 includes the text-embedded extraction unit 157 and the signal extraction unit 1800.
(Outline of Operation)

As shown in FIG. 25, the variable-length descriptive text D1300 is input to the text-embedded extraction unit 157, and is converted into the embedded vector D1301 of the descriptive text D1300 (text-embedded vector D1301). The mixture-signal time waveform D50 and the text-embedded vector D1301 are input to the signal extraction unit 1800 to generate the extraction-signal time waveform D72.
(Specific Operation)

Figure 26:
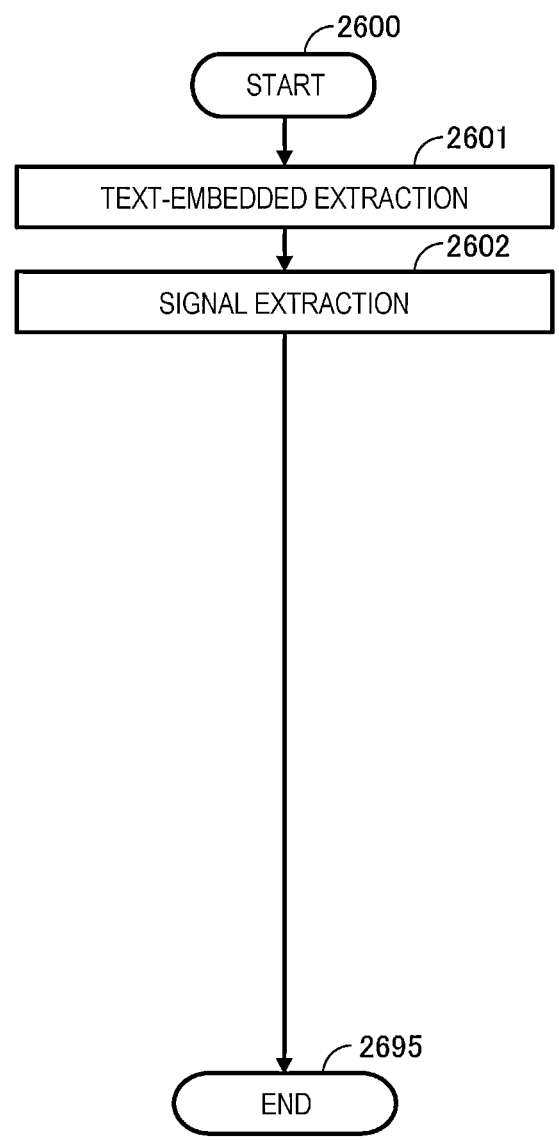
FIG. 26 is a flowchart showing an example of a processing flow of the sound extraction subsystem.

FIG. 26 is an example of a processing flow of the sound extraction subsystem 150. The sound extraction subsystem 150 executes the processing flow of FIG. 26. When the mixture-signal time waveform D50 and the variable-length descriptive text D1300 are input, the sound extraction subsystem 150 starts processing from step 2600 in FIG. 26, sequentially executes processing of steps 2601 and 2602 described below, and then proceeds to step 2695 and temporarily ends the processing flow.

Step 2601: The sound extraction subsystem 150 calculates (extracts), by the text-embedded extraction unit 157, the text-embedded vector D1301 from the variable-length descriptive text D1300 using a latest text-embedded extraction model.

Step 2602: The sound extraction subsystem 150 generates, by the signal extraction unit 1800, the extraction-signal time waveform D72 from the mixture-signal time waveform D50 and the text-embedded vector D1301 using a latest signal extraction model.

Effects

As described above, the sound extraction system 2200 according to the eighth embodiment of the invention can accurately extract (extract or emphasize), from mixture signals, a signal corresponding to a sound which the user wants to extract. With such a basic configuration, even when a range of the sound which the user wants to extract cannot be defined in advance as a certain type of event, the sound extraction system 2200 according to the eighth embodiment can extract the sound. The descriptive text is relatively generic and can be used across the application site. In the sound extraction system 2200 according to the eighth embodiment, the mixture-signal time waveform is directly inputted to the neural network without being converted into the time-frequency representation, and thus a reduction in the extraction accuracy due to the use of the time-frequency representation can be avoided. Since the sound extraction system 2200 according to the eighth embodiment generates the extraction-signal time waveform without performing the phase restoration processing, there is also an advantage that distortion due to the phase restoration processing does not occur.

Modifications

The invention is not limited to the above-mentioned embodiments, and various modifications can be made within the scope of the invention. Further, the embodiments described above can be combined with each other without departing from the scope of the invention. Further, within the scope of the invention, a part of a configuration of an embodiment can be replaced with a configuration of another embodiment. Further, within the scope of the invention, it is also possible to add a configuration of another embodiment to a configuration of an embodiment. Further, within the scope of the invention, a part of the configuration of each embodiment can be added to, deleted from, or replaced with another configuration.

Further, in each of the above embodiments, text input to the sound extraction subsystem 150 may be input by operating an operation device such as a keyboard. Further, in each of the above embodiments, the text input to the sound extraction subsystem 150 may be input by converting human speech into text by speech recognition technology. Further, in each of the above embodiments, mixture signals input to the sound extraction subsystem 150 may be input from an acoustic device such as a microphone.

What is claimed is:

1. A sound extraction system comprising:
   a sound extraction device configured to extract, from mixture signals including a signal corresponding to an extraction target sound, the signal corresponding to the extraction target sound, wherein
   the sound extraction device is configured to:
      extract the signal corresponding to the extraction target sound from the mixture signals based on the mixture signals and a text representing a range of the extraction target sound,
      generate, based on the mixture signals and the text representing the range of the extraction target sound, a time-frequency mask for extracting the signal corresponding to the extraction target sound, and
      apply the time-frequency mask to the mixture signals and extract the signal corresponding to the extraction target sound from the mixture signals; and
   a learning device configured to generate a trained model, which is used for generating the time-frequency mask, by executing machine learning using a training data set including a target signal corresponding to the extraction target sound, training mixture signals obtained by mixing the target signal and a signal corresponding to noise other than the extraction target sound, and a training text corresponding to the extraction target sound, wherein
   the sound extraction device is also configured to:
      generate, using the trained model generated by the learning device, the time-frequency mask based on the mixture signals and the text representing the range of the extraction target sound, wherein the learning device is configured to generate, as the trained model,
      a text-embedded extraction model configured to output a text-embedded vector from data obtained by preprocessing the text representing the range of the extraction target sound, and a time-frequency mask generation model configured to generate the time-frequency mask from a sound feature vector of the mixture signals and the text-embedded vector, and
   the sound extraction device is configured to:
      calculate the sound feature vector of the mixture signals from the mixture signals,
      calculate, using the text-embedded extraction model generated by the learning device, the text-embedded vector from the text representing the range of the extraction target sound, and
      generate, using the time-frequency mask generation model generated by the learning device, the time-frequency mask from the calculated text-embedded vector and sound feature vector of the mixture signals.

2. The sound extraction system according to claim 1, further comprising:
   a storage device which stores a trained model used for generating the time-frequency mask, wherein
   the sound extraction device is configured to
   generate, using the trained model, the time-frequency mask based on the mixture signals and the text representing the range of the extraction target sound.

3. The sound extraction system according to claim 2, wherein
   the storage device stores, as the trained model, a text-embedded extraction model configured to output a text-embedded vector from data obtained by preprocessing the text representing the range of the extraction target sound, and a time-frequency mask generation model configured to generate the time-frequency mask from a sound feature vector of the mixture signals and the text-embedded vector, and
   the sound extraction device is configured to
   calculate the sound feature vector of the mixture signals from the mixture signals,
   calculate, using the text-embedded extraction model, the text-embedded vector from the text representing the range of the extraction target sound, and
   generate, using the time-frequency mask generation model, the time-frequency mask from the calculated text-embedded vector and sound feature vector of the mixture signals.

4. The sound extraction system according to claim 2, wherein
   the storage device stores, as the trained model, a feature extraction model configured to output a sound feature vector of the mixture signals from the mixture signals, a text-embedded extraction model configured to output a text-embedded vector from data obtained by preprocessing the text representing the range of the extraction target sound, and a time-frequency mask generation model configured to generate the time-frequency mask from the sound feature vector of the mixture signals and the text-embedded vector, and
   the sound extraction device is configured to
   calculate, using the feature extraction model, the sound feature vector of the mixture signals from the mixture signals,
   calculate, using the text-embedded extraction model, the text-embedded vector from the text representing the range of the extraction target sound, and
   generate, using the time-frequency mask generation model, the time-frequency mask from the calculated text-embedded vector and sound feature vector of the mixture signals.

5. The sound extraction system according to claim 1, wherein
the learning device is configured to generate, as the trained model,
a feature extraction model configured to output a sound feature vector of the mixture signals from the mixture signals,
a text-embedded extraction model configured to output a text-embedded vector from data obtained by preprocessing the text representing the range of the extraction target sound, and
a time-frequency mask generation model configured to generate the time-frequency mask from the sound feature vector of the mixture signals and the text-embedded vector, and
the sound extraction device is configured to
calculate, using the feature extraction model generated by the learning device, the sound feature vector of the mixture signals from the mixture signals,
calculate, using the text-embedded extraction model generated by the learning device, the text-embedded vector from the text representing the range of the extraction target sound, and
generate, using the time-frequency mask generation model generated by the learning device, the time-frequency mask from the calculated text-embedded vector and sound feature vector of the mixture signals.

6. The sound extraction system according to claim 1, further comprising:
a learning device configured to generate a trained model, which is used for generating the time-frequency mask, by acquiring an initial trained model from an outside and updating the initial trained model by executing machine learning using a training data set including a target signal corresponding to the extraction target sound, training mixture signals obtained by mixing the target signal and a signal corresponding to noise other than the extraction target sound, and a training text corresponding to the extraction target sound, wherein
the sound extraction device is configured to
generate, using the trained model generated by the learning device, the time-frequency mask based on the mixture signals and the text representing the range of the extraction target sound.

7. The sound extraction system according to claim 1, further comprising:
a storage device which stores a trained model used for extracting the signal corresponding to the extraction target sound from the mixture signals based on the mixture signals and the text representing the range of the extraction target sound, wherein
the sound extraction device is configured to
extract, using the trained model, the signal corresponding to the extraction target sound from the mixture signals based on the mixture signals and the text representing the range of the extraction target sound.

8. The sound extraction system according to claim 7, wherein
the storage device stores, as the trained model, a text-embedded extraction model configured to output a text-embedded vector from data obtained by preprocessing the text representing the range of the extraction target sound, and a signal extraction model configured to generate a time waveform of the signal corresponding to the extraction target sound from the text-embedded vector and a time waveform of the mixture signals, and
the sound extraction device is configured to
calculate, using the text-embedded extraction model, the text-embedded vector from the text representing the range of the extraction target sound, and
extract, using the signal extraction model, the signal corresponding to the extraction target sound from the mixture signals by generating the time waveform of the signal corresponding to the extraction target sound from the calculated text-embedded vector and the time waveform of the mixture signals.

9. The sound extraction system according to claim 7, further comprising:
a learning device which generates a trained model, which is used for extracting the signal corresponding to the extraction target sound from the mixture signals based on the mixture signals and the text representing the range of the extraction target sound, by executing machine learning using a training data set including a target signal corresponding to the extraction target sound, training mixture signals obtained by mixing the target signal and a signal corresponding to noise other than the extraction target sound, and a training text corresponding to the extraction target sound, wherein
the sound extraction device is configured to
extract, using the trained model generated by the learning device, the signal corresponding to the extraction target sound from the mixture signals, based on the mixture signals and the text representing the range of the extraction target sound.

10. The sound extraction system according to claim 7, further comprising:
a learning device which generates a trained model, which is used for extracting the signal corresponding to the extraction target sound from the mixture signals based on the mixture signals and the text representing the range of the extraction target sound, by acquiring an initial trained model from an outside and updating the initial trained model by executing machine learning using a training data set including a target signal corresponding to the extraction target sound, training mixture signals obtained by mixing the target signal and a signal corresponding to noise other than the extraction target sound, and a training text corresponding to the extraction target sound, wherein
the sound extraction device is configured to
extract, using the trained model generated by the learning device, the signal corresponding to the extraction target sound from the mixture signals, based on the mixture signals and the text representing the range of the extraction target sound.

11. The sound extraction system according to claim 1, further comprising:
a storage device in which the target signal corresponding to the extraction target sound and the signal corresponding to noise other than the extraction target sound are stored, wherein
the learning device is configured to
generate the training mixture signals by reading out the target signal corresponding to the extraction target sound and the signal corresponding to the noise other than the extraction target sound from the storage device and by mixing the target signal corresponding to the extraction target sound and the signal corresponding to the noise other than the extraction target sound.

12. The sound extraction system according to claim 1, wherein
the text is a text representing onomatopoeia.

13. The sound extraction system according to claim 1, wherein
the text is a text representing descriptive text.

14. A sound extraction method comprising:
providing a sound extraction device configured to extract, from mixture signals including a signal corresponding to an extraction target sound, the signal corresponding to the extraction target sound;
extracting the signal corresponding to the extraction target sound from the mixture signals based on the mixture signals and a text representing a range of the extraction target sound;
generating, based on the mixture signals and the text representing the range of the extraction target sound, a time-frequency mask for extracting the signal corresponding to the extraction target sound;
applying the time-frequency mask to the mixture signals and extract the signal corresponding to the extraction target sound from the mixture signals;
generating, using a learning device, a trained model, which is used for generating the time-frequency mask, by executing machine learning using a training data set including a target signal corresponding to the extraction target sound, training mixture signals obtained by mixing the target signal and a signal corresponding to noise other than the extraction target sound, and a training text corresponding to the extraction target sound;
generating, using the trained model generated by the learning device, the time-frequency mask based on the mixture signals and the text representing the range of the extraction target sound, wherein
the learning device is configured to generate, as the trained model,
a text-embedded extraction model configured to output a text-embedded vector from data obtained by pre-processing the text representing the range of the extraction target sound, and a time-frequency mask generation model configured to generate the time-frequency mask from a sound feature vector of the mixture signals and the text-embedded vector;
calculating the sound feature vector of the mixture signals from the mixture signals;
calculating, using the text-embedded extraction model generated by the learning device, the text-embedded vector from the text representing the range of the extraction target sound; and
generating, using the time-frequency mask generation model generated by the learning device, the time-frequency mask from the calculated text-embedded vector and sound feature vector of the mixture signals.

* * * * *